(12) United States Patent
Lu et al.

(10) Patent No.: US 10,963,867 B2
(45) Date of Patent: Mar. 30, 2021

(54) HARDWARE WALLET AND HARDWARE WALLET HOLDER IDENTITY VERIFICATION METHOD

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 153 days.

(21) Appl. No.: 16/344,047

(22) PCT Filed: Dec. 27, 2017

(86) PCT No.: PCT/CN2017/118831
§ 371 (c)(1),
(2) Date: Apr. 23, 2019

(87) PCT Pub. No.: WO2018/121555
PCT Pub. Date: Jul. 5, 2018

(65) Prior Publication Data
US 2020/0065799 A1 Feb. 27, 2020

(30) Foreign Application Priority Data
Dec. 28, 2016 (CN) .......................... 201611233542.9

(51) Int. Cl.
*G06Q 20/36* (2012.01)
*A45C 1/06* (2006.01)
*G06Q 20/40* (2012.01)

(52) U.S. Cl.
CPC ............ *G06Q 20/363* (2013.01); *A45C 1/06* (2013.01); *G06Q 20/3674* (2013.01); *G06Q 20/40145* (2013.01)

(58) Field of Classification Search
None
See application file for complete search history.

(56) References Cited

U.S. PATENT DOCUMENTS

| | | |
|---|---|---|
| 2014/0058936 A1 | 2/2014 | Ren et al. |
| 2018/0308095 A1* | 10/2018 | Hammad ................. G06F 21/34 |
| 2018/0330349 A1* | 11/2018 | Uhr ....................... G06Q 20/145 |
| 2019/0325406 A1* | 10/2019 | Melika .................. G06Q 20/065 |
| 2020/0065799 A1* | 2/2020 | Lu ............................ A45C 1/06 |
| 2020/0322157 A1* | 10/2020 | Wease ................. H04L 63/0861 |

* cited by examiner

*Primary Examiner* — Firmin Backer
(74) *Attorney, Agent, or Firm* — Hammer & Associates, P.C.

(57) ABSTRACT

A hardware wallet and a hardware wallet holder identity verification method, relating to the field of digital currency. The hardware wallet comprises a virtual machine, a biological characteristic authentication module, and multiple wallet applications. Each wallet application stores a private key. The hardware wallet records, for each wallet application, a biological characteristic for verifying hardware wallet holder identity corresponding to each wallet application by using the virtual machine and the biological characteristic authentication module. Private key pair digital currency in the current wallet application can be used for trading only when verification of the hardware wallet holder identity corresponding to the current wallet application succeeds. The digital currency security protection mechanism is improved, and identity authentication management of multiple wallet applications is realized.

20 Claims, 9 Drawing Sheets

HARDWARE WALLET AND HARDWARE WALLET HOLDER IDENTITY VERIFICATION METHOD

FIELD OF THE INVENTION

Figure 1:
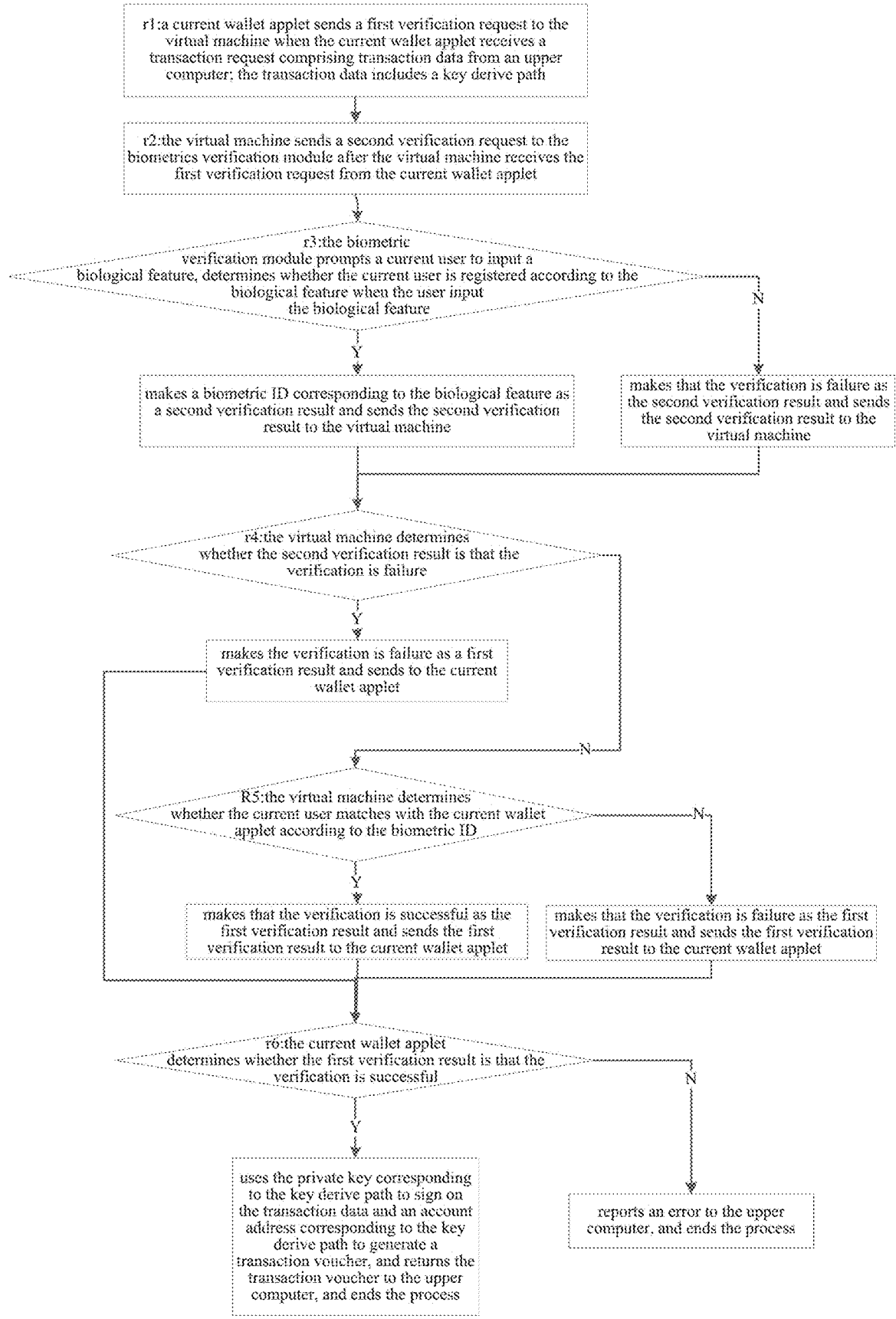

The present invention relates to a hardware wallet and a method for verifying an identity of a holder of the hardware wallet, which belongs to the field of digital cash.

PRIOR ART

Digital currency is an alternative currency in the form of electronic money. Both digital and cryptographic currencies are digital currencies. They cannot be completely equivalent to the virtual currency in the virtual world because they are more used in real commodities and services transactions. Cryptocurrency is the digital currency that uses the cryptographic algorithm; the vast majority of cryptographic operations follow the asymmetric encryption system already well established in the field of information security for digesting and signing of data; as a result, the security of the private key becomes the most important issue of digital currency. At present, the most common solution is to store the private key on the application software or on the server of the service provider, and run on the software or on the server provider. However, in the prior art, the private key is subject to security risks in storage. It is vulnerable to attack from hackers and tends to be stolen, causing losses to digital money holders. Therefore, how to improve the security mechanism of digital currency is a technical problem that needs to be solved.

SUMMARY OF THE INVENTION

The object of the present invention is to provide a hardware wallet and a method for verifying an identity of a holder of the hardware wallet, the hardware wallet includes several wallet applets, each of which stores one private key, in this way, the method can avoid the private key from being stolen by a hacker, thus, the method makes the digital cash safer and realizes the management of identity verification of multiple wallet applets.

Thus, according to the first aspect of the present invention, it provides a method for verifying the identity of the holder of the hardware wallet, the hardware wallet includes a virtual machine, a biometrics verification module and a multiple of wallet applets; the said method comprises the following steps:

Step r1, sending, by a current wallet applet, a first verification request to the virtual machine if the current wallet applet receives a transaction request including transaction data from an upper computer; the transaction data including a key derive path;

Step r2, sending, by the virtual machine, a second verification request to the biometrics verification module after the virtual machine receives the first verification request from the current wallet applet;

Step r3, prompting, by the biometrics verification module, a current user to input a biological feature, determining whether the current user has registered according to the biological feature when the user input the biological feature, if yes, making a biometric ID corresponding to the biological feature as a second verification result and sending the second verification result to the virtual machine, and the virtual machine executing Step r4; otherwise, making that the verification is failure as the second verification result and sending the second verification result to the virtual machine, and the virtual machine executing Step r4;

Step r4, determining, by the virtual machine, whether the second verification result is that the verification is failure, if yes, making the verification is failure as a first verification result and sending the result to the current wallet applet, and the current wallet applet executing Step r6; otherwise, executing Step r5;

Step r5, determining, by the virtual machine, whether the current user matches with the current wallet applet according to the biometric ID, if yes, making that the verification is successful as the first verification result and sending the first verification result as the current wallet applet, and the current wallet applet executing Step r6; otherwise, making that the verification is failure as the first verification result and sending the first verification result to the current wallet applet, and the current wallet applet executing Step r6; and Step r6, determining, by the current wallet applet, whether the first verification result is that the verification is successful, if yes, using the private key corresponding to the key derive path to sign on the transaction data and an account address corresponding to the key derive, path to generate a transaction voucher, and returning the transaction voucher to the upper computer, and ending the process; otherwise, reporting an error to the upper computer, and ending the process.

According to the second aspect of the present invention, it provides a hardware wallet comprising a virtual machine, a biometrics verification module and a multiple of wallet applets;

a current wallet applet of the multiple of wallet applets including a first receiving sub-module, a first sending sub-module, a second receiving sub-module, a first determining sub-module, a first generating sub-module and a second sending sub-module;

the first receiving sub-module is configured to receive the transaction request which comprises transaction data from the upper computer; the transaction data includes a key derive path;

the first sending sub-module is configured to send a first verification request to the virtual machine;

the second receiving sub-module is configured to receive a first verification result from the virtual machine;

the first determining sub-module is configured to determine whether the first verification result received by the second receiving sub-module is that the verification is successful;

the first generating sub-module is configured to use the private key corresponding to the key derive path received by the first receiving sub-module to sign on the transaction data and an account address corresponding to the key derive path to generate the transaction voucher in the case that the first determining sub-module determines that the first verification result is the verification is successful; and the second sending sub-module is configured to return the transaction voucher generated by the first generating sub-module to the upper computer; and reporting an error to the upper computer in the case that the first determining sub-module determines that the verification is failure;

the virtual machine includes a third receiving sub-module, a third sending sub-module, a fourth receiving sub-module, a second determining sub-module, a third determining sub-module and a fourth sending sub-module;

the third receiving sub-module is configured to receive the first verification request from the current wallet applet;

the third sending sub-module is configured to send the second verification request to the biometrics verification module;

the fourth receiving sub-module is configured to receive the second verification result from the biometrics verification module;

the second determining sub-module is configured to determine whether the second verification result, which is received by the fourth receiving sub-module, is that the verification is failure;

the third determining sub-module is configured to determine whether the current user matches with the current wallet applet according to the biometric ID in the case that the second determining sub-module determines that the second verification result is that the verification is failure; and the fourth sending sub-module is configured to make that the verification is failure as the first verification result and send the first verification result to the current wallet applet in the case that the second determining sub-module determines that the second verification result is that the verification is that the verification is failure; to make that the verification is failure as the first verification result and send the first verification result to the current wallet applet in the case that the third determining sub-module determines that the current user does not match with the current wallet applet; and to make that the verification is successful as the first verification result and send the first verification result to the current wallet applet in the case that the third determining sub-module determines that the current user matches with the current wallet applet;

the biometrics verification module including a fifth receiving sub-module, a first prompting sub-module, a first testing sub-module, a fourth determining sub-module and a fifth sending sub-module;

the fifth receiving sub-module is configured to receive the second verification request from the virtual machine;

the first prompting sub-module is configured to prompt the current user to input a biological feature after the fifth receiving sub-module receives the second verification request from the virtual machine;

the first testing sub-module is configured to test whether the user inputs a biological feature;

the fourth determining sub-module is configured to determine whether the current user has registered according to the biological feature tested by the first testing sub-module; and the fifth sending sub-module is configured to make the biometric ID corresponding to the biological feature as the second verification result and send the second verification result to the virtual machine in the case that the fourth determining sub-module determines the current user has registered; to make that the verification is failure as the second verification result and send the second verification result to the virtual machine in the case that the fourth determining sub-module determines that the user has not registered.

The advantage of the present invention is to provide a method for verifying the identity of the holder of the hardware wallet and the hardware wallet, in which, the hardware wallet comprises a multiple of wallet applets, each of which stores a private key, the hardware wallet inputs biological features of the holders of the hardware wallet corresponding to each wallet applet for each wallet applet, and the biological features are used for verification. Only when the identity of the holder of the hardware wallet corresponding to the current wallet applet is verified, the user can use the private key in the current wallet applet to perform the transaction on the digital currency; the present invention not only makes the digital currency safer, but also realizes the management of identity verification of several wallet applets.

BRIEF DESCRIPTION OF ACCOMPANYING DRAWINGS

Figure 2:
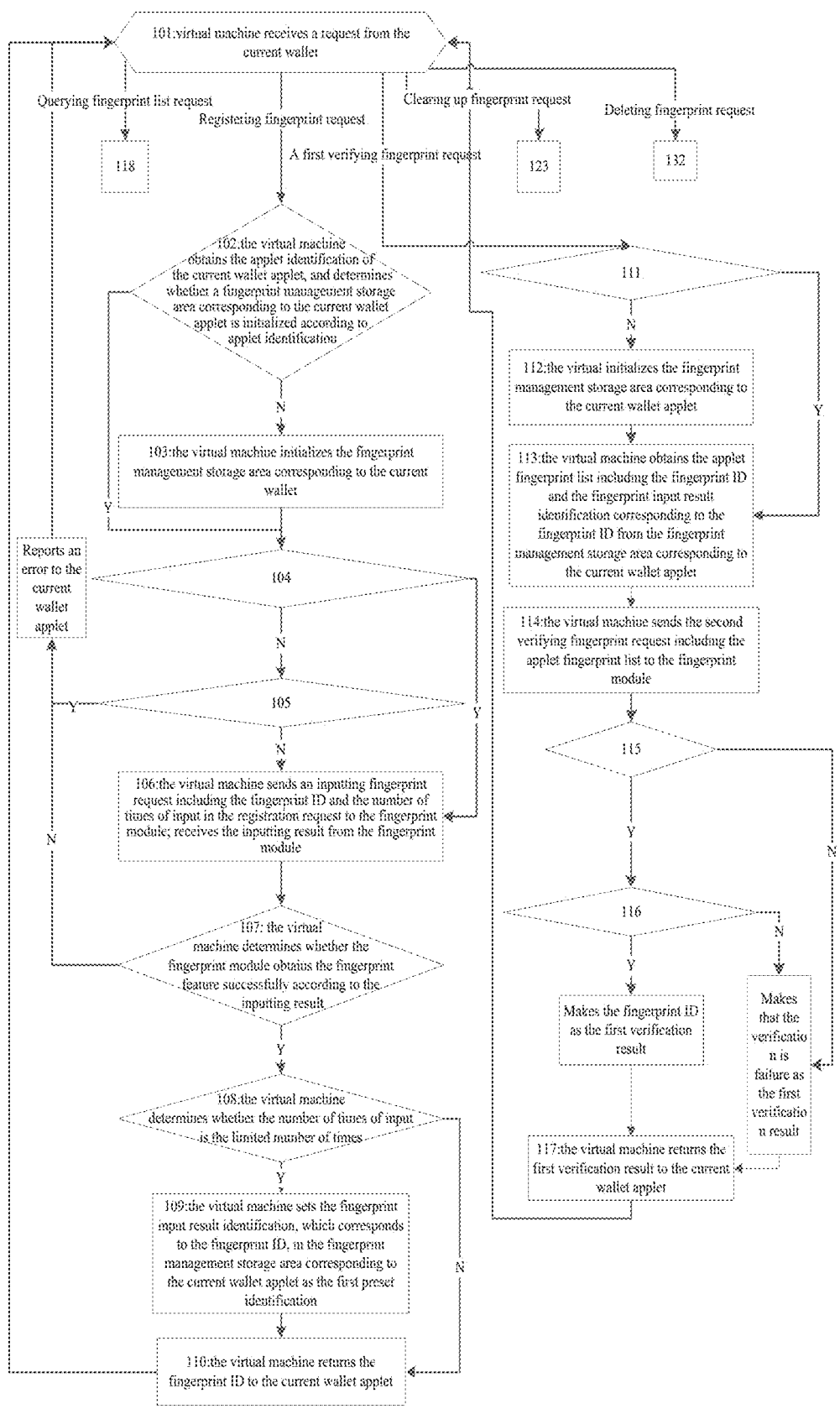
Figure 3:
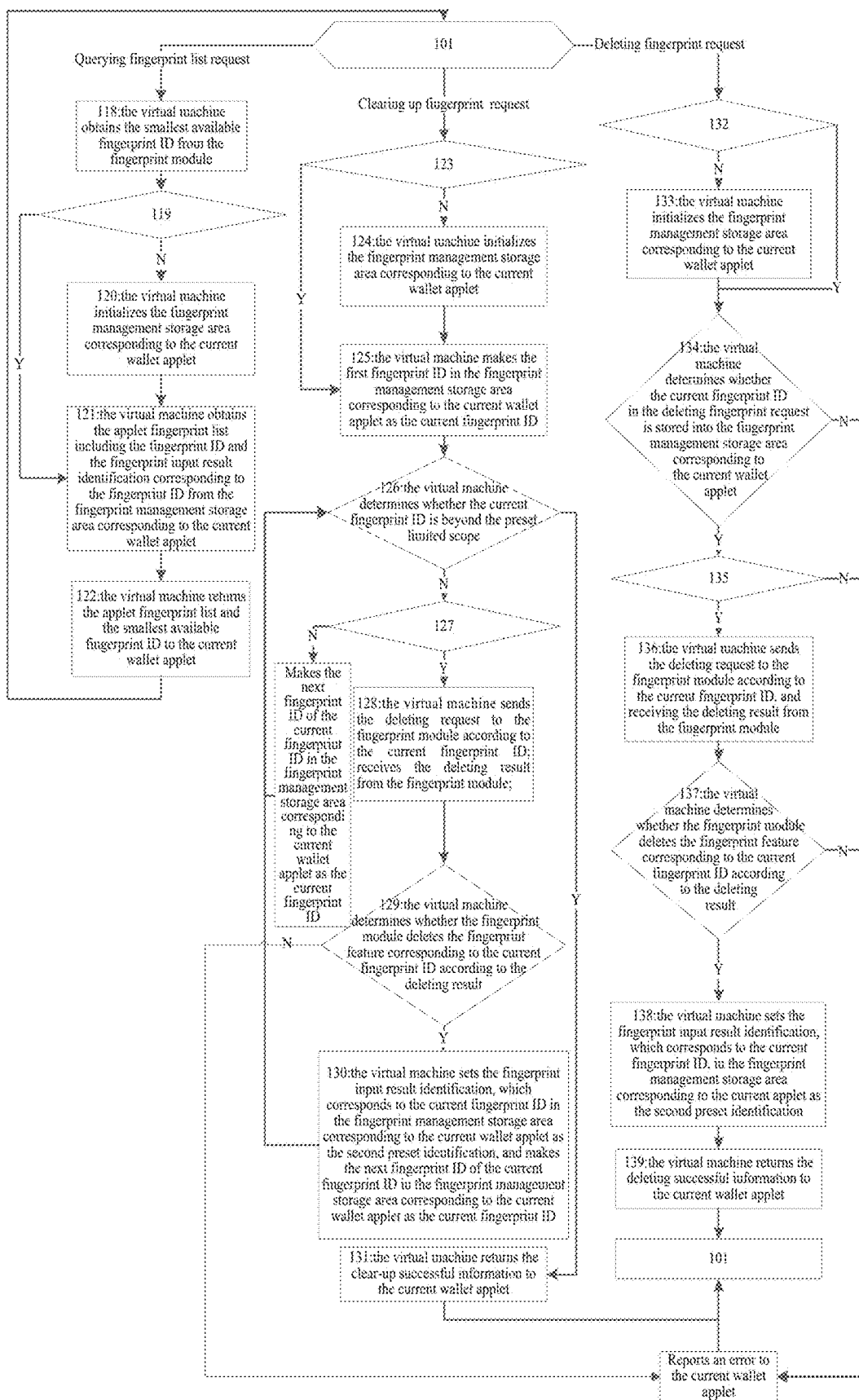
Figure 9:
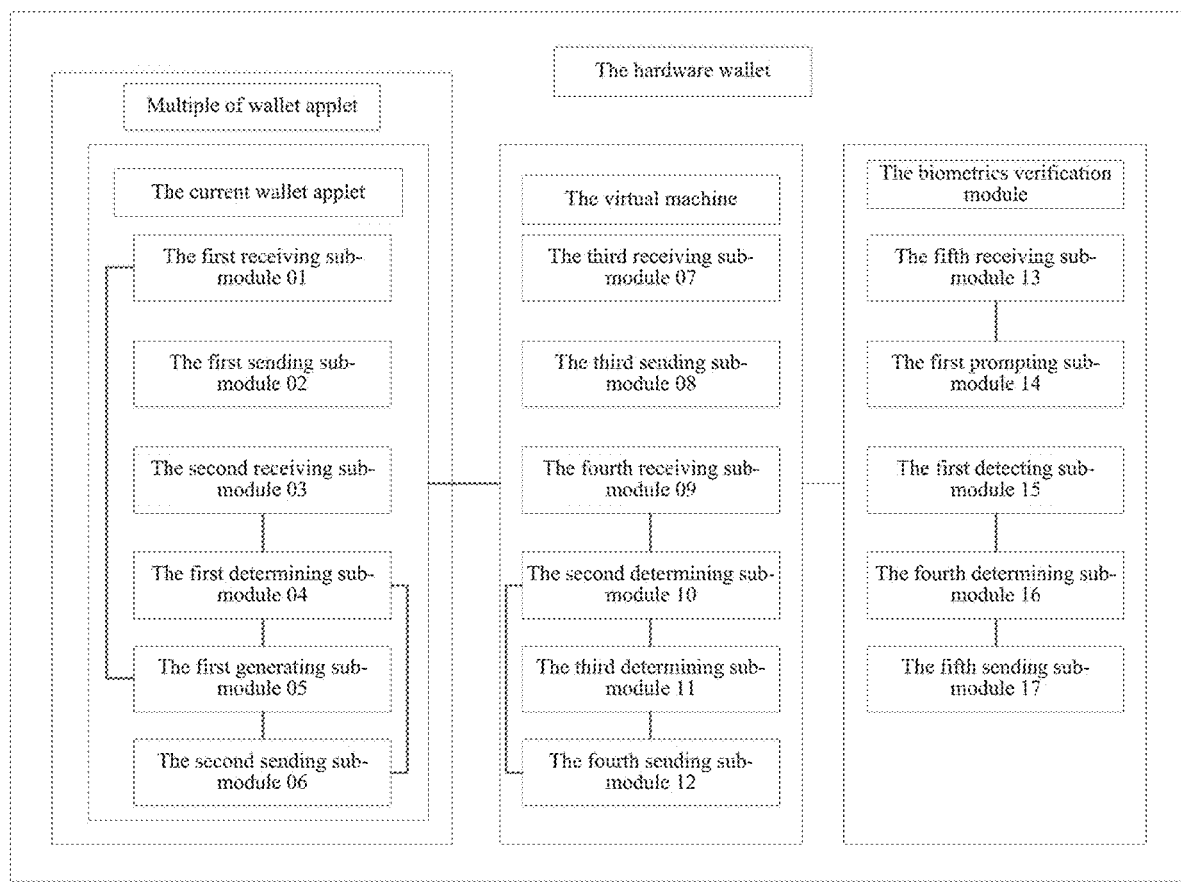

FIG. 1 provides a flow diagram of a method for verifying the identity of the holder of the hardware wallet according to Embodiment 1 of the present invention;

FIG. 2 and FIG. 3 provide a flow diagram of a method for verifying the identity of the holder of the hardware wallet according to Embodiment 2 of the present invention;

FIG. 4, FIG. 5, FIG. 6, FIG. 7 and FIG. 8 provide a flow diagram of fingerprint registration, a flow diagram of fingerprint verification, a flow diagram of fingerprint list query, a flow diagram of fingerprint clearing and a flow diagram of fingerprint deletion in the method for verifying the identity of the holder of the hardware wallet, respectively, according to Embodiment 2 of the present invention;

FIG. 9 provides a block diagram of a hardware wallet according to Embodiment 3 of the present invention.

DETAILED DESCRIPTION OF THE INVENTION

The technical solution in the Embodiment of the present invention is further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

Embodiment 1

It provides a method for verifying an identity of a holder of a hardware wallet according to Embodiment 1 of the present invention, as shown in FIG. 1, including:

the hardware wallet includes a virtual machine, a biometrics verification module and a multiple of wallet applets;

Step r1, a current wallet applet sends a first verification request to the virtual machine in the case that the current wallet applet receives a transaction request comprising transaction data from an upper computer; the transaction data includes a key derive path;

Step r2, the virtual machine sends a second verification request to the biometrics verification module after the virtual machine receives the first verification request from the current wallet applet;

Step r3, the biometrics verification module prompts a current user to input a biological feature, determines whether the current user has registered according to the biological feature when the user input the biological feature, if yes, makes a biometric ID corresponding to the biological feature as a second verification result and sends the second verification result to the virtual machine, and the virtual machine executes Step r4; otherwise, makes that the verification is failure as the second verification result and sends the second verification result to the virtual machine, and the virtual machine executes Step r4;

in Embodiment 1, the biological feature can be, but not limited to, a fingerprint feature, a face recognition feature or other biological features which can be identified;

in which, determining whether the current user has been registered according to the biological feature specifically includes that the biometrics verification module searches for the said biological feature from a biometrics database of the biometrics verification module, the current user is registered if the biological feature is found; the current user has not been registered if the biological feature is not found.

Step r4, the virtual machine determines whether the second verification result is that the verification is failure, if yes, makes the verification is failure as a first verification result and sends the result to the current wallet applet, and the current wallet applet executes Step r6; otherwise, executes Step r5;

Step r5, the virtual machine determines whether the current user matches with the current wallet applet according to the biometric ID, if yes, makes that the verification is successful as the first verification result and sends the first verification result to the current wallet applet, and the current wallet applet executes Step r6; otherwise, makes that the verification is failure as the first verification result and sends the first verification result to the current wallet applet, and the current wallet applet executes Step r6;

in which, determining whether the current user matches with the current wallet applet according to the biometric ID specifically includes:

the virtual machine determines whether a biometrics-input-result identification, which corresponds to the biometric ID, in a biometrics-register-result list corresponding to the current wallet applet is a first preset identification, if yes, current user matches with the current wallet applet; otherwise, the current user does not match with the current wallet applet.

Step r6, the current wallet applet determines whether the first verification result is that the verification is successful, if yes, uses the private key corresponding to the key derive path to sign on the transaction data and an account address corresponding to the key derive path to generate a transaction voucher, and returns the transaction voucher to the upper computer, and ends the process; otherwise, reports an error to the upper computer, and ends the process.

In Embodiment 1, before using the private key corresponding to the key derive path to sign on the transaction data and the account address corresponding to the key derive path in order to generate the transaction voucher, the method further includes: the current wallet applet generates a public key and a private key, which correspond to the key derive path, via a key derive algorithm according to a master key of the current wallet applet, and generates the account address according to the public key.

In Embodiment 1, Step r1 can further include:

the virtual machine receives an activate request including an activating-wallet-applet instruction and an applet identification from the upper computer, activates the wallet applet corresponding to the applet identification, and makes the wallet applet corresponding to the applet as the current wallet applet, and returns a activation-successful response to the upper computer.

In Embodiment 1, the second verification request can further include: a biometrics-register-result list corresponding to the current wallet applet; correspondingly, Step r3 specifically includes: the biometrics verification module prompts the user to input a biological feature, determines whether the current user has registered and matches with the current wallet applet according to the biological feature, the biometrics database and the biometrics-register-result list when the user input the biological feature, if yes, makes a biometric ID, corresponding to the biological feature, in the biometrics-register-result list as a second verification result and sends the second verification result to the virtual machine; makes that the verification is failure as the second verification result and sends the second verification result to the virtual machine if the biological feature is not found.

Furthermore, between Step r1 and Step r2, the method further includes: the virtual machine obtains the biometrics-register-result list corresponding to the current wallet applet.

Furthermore, the first verification request can include: the biometrics-register-result list corresponding to the current wallet applet; correspondingly, before Step r1, the method further includes:

Step c1, the virtual machine receives a querying-biometrics-register-result-list request from the current wallet applet;

Step c2, the virtual machine returns the biometrics-register-result list corresponding to the current wallet applet to the current wallet applet.

In Embodiment 1, determining whether the current user has registered and matches with the current wallet applet according to the biological feature, the biometrics database and the biometrics-register-result list specifically includes: searches for the biometric ID which corresponds to the biological feature and whose biometrics input result identification in the biometrics-register-result list is the first preset identification according to the biological feature, the biometrics database and the biometrics-register-result list, the current user has registered and the current user matches with the current wallet applet in the case that the biometric ID is found; the current user has not registered and/or the user does not match with the current wallet applet if the biometric ID is not found.

In Embodiment 1, the method for verifying the identity of the holder of a hardware wallet can further include:

Step s1, the virtual machine sends an input request to the biometrics verification module when the virtual machine receives a registration request from the current wallet;

Step s2, the biometrics verification module prompts the user to input a biological feature, builds a corresponding relation between the biological feature and the current biometric ID when the biological feature input by the user is detected, sets the biometrics input result identification, which corresponds to the current biometric ID, in the biometrics database of the biometrics verification module as the first preset identification, stores the current biometric ID and the biological feature corresponding to the current biometric ID into the biometrics database, set the input result as inputting successfully, and sends the input result to the virtual machine; sets the input result as inputting unsuccessfully and sends the input result to the virtual machine when no biological feature input by the user is detected;

Step s3, the virtual machine determines whether the biometrics verification module successfully obtains the biological feature corresponding to the current biometric ID according to the input result, if yes, goes to Step s4; otherwise, reports an error to the current wallet applet, and ends the process;

Step s4, the virtual machine sets the biometrics input result identification, which corresponds to the current biometric ID, in the biometrics-register-result list corresponding to the current wallet applet as the first preset identification, returns a result that the registration is successful to the current wallet applet, and ends the process.

Furthermore, the registration request can also include the current biometric ID; the input request can also include the current biometric ID.

Furthermore, before Step s1, the method includes: the virtual machine receives an obtaining-current-biometrics-ID request from the current wallet applet, and sends the obtaining-current-biometrics-ID request to the biometrics verification module; the biometrics verification module obtains the current biometric ID from the biometrics database itself, and returns the current biometric ID to the virtual machine; the virtual machine returns the current biometric ID to the current wallet applet.

Furthermore, the biometrics verification module obtaining the current biometric ID from the biometrics database itself specifically includes: the biometrics verification module obtains a register result identification from the biometrics database, and the register result is the minimum biometric ID of the second preset identification, and the minimum biometric ID is made as the current biometric ID.

In Embodiment 1, the input request can also include the current biometric ID; correspondingly, after the virtual machine receives the registration request from the current wallet applet, the method further includes: the virtual machine obtains the current biometric ID from the biometrics-register-result list.

Furthermore, the virtual machine obtaining the current biometric ID from the biometrics-registration-result list corresponding to the current wallet applet specifically includes: obtains the minimum biometric ID, whose registration result identification is the second preset identification, from the biometrics-register-result list corresponding to the current wallet applet, and makes the minimum biometric ID as the current biometric ID.

In Embodiment 1, in the case that the input result is inputting successfully, the input result can also include: the current biometric ID; correspondingly, building a corresponding relation between the biological feature and the current biometric ID specifically includes building a corresponding relation between the biological feature and the current biometric ID in the biometrics database itself.

Furthermore, before building the corresponding relation between the biological feature and the current biometric ID, the method further includes: the biometrics verification module obtains the minimum biometric ID, whose registration result identification is the second preset identification, from the biometrics database itself, and makes the minimum biometric ID as the current biometric ID.

In Embodiment 1, in the case that the registration request further includes the current biometric ID, the input request further includes the current biometric ID, correspondingly, after the virtual machine receives the registration request from the current wallet applet, before the virtual machine sends the input request to the biometrics verification module, the method further includes:

Step a1, the virtual machine detects whether the biometrics input result identification, which corresponds to the current biometric ID, in the biometrics-register-result list corresponding to the current wallet applet is the first preset identification, if yes, sends the input request to the biometrics verification module, continues; otherwise, goes to Step a2;

Step a2, the virtual machine sends a first searching request including the biometric ID to the biometrics verification module;

Step a3, the biometrics verification module determines whether the biometrics input result identification, which corresponds to the current biometric ID, in the biometrics database of the biometrics verification module is the first preset identification after the first searching request is received from the virtual machine, if yes, sets the first searching result as failure, and sends the first searching result to the virtual machine; otherwise, sets the first searching result as successful, and sends the first searching result to the virtual machine; and Step a4, the virtual machine determines whether the biometrics input result, which corresponds to the current biometric ID, in the biometrics database of the biometrics verification module is the first preset identification, if yes, reports an error to the current wallet applet, ends the process; otherwise, sends the input request to the biometrics verification module, continues.

In Embodiment 1, the register request can also include the number of times of input; the input request can also include the number of times of input;

correspondingly, in the case that the biometrics input result identification, which corresponds to the current biometric ID, in the biometrics database of the biometrics verification module is the first preset identification, before Step s4, the method further includes: the virtual machine determines whether the number of times of input is a preset limited times, if yes, goes to Step s4; otherwise, returns that the registration is successful to the current wallet applet, and returns to Step s1;

after the biometrics verification module builds a corresponding relation between the biological feature and the current biometric ID, before the biometrics input result identification, which corresponding to the current biometric ID, in the biometrics database is set as the first preset identification, the method further includes: determines whether the number of times of input is the preset limited times, if yes, sets the biometrics input result identification, which corresponds to the current biometric ID, in the biometrics database as the first preset identification, stores the current biometric ID and the biological feature corresponding to the current biometric ID into the biometrics database, and sets the input result as input successful, and sends the input result to the virtual machine; otherwise, sets the input result as input successful, and sends the input result to the virtual machine.

In Embodiment 1, the method for verifying the identity of the holder of the hardware wallet further includes:

Step d1, the virtual machine makes the first biometric ID in the biometrics-register-result list as the current biometric ID when a clearing up request is received from the current wallet applet by the virtual machine;

Step d2, the virtual machine determines whether the current biometric ID is beyond a preset limit scope, if yes, returns information that clearing up is successful to the current wallet applet, and ends the process; otherwise, goes to Step d3;

Step d3, the virtual machine determines whether the biometrics input result identification, which corresponds to the current biometric ID, in the biometrics-register-result list corresponding to the current wallet applet is the first preset identification, if yes, goes to Step d4; otherwise, goes to Step d8;

Step d4, the virtual machine sends a deleting request including the current biometric ID to the biometrics verification module;

Step d5, the biometrics verification module searches for the current biometric ID from the biometrics database itself, if the current biometric ID is found, sets biometrics input result identification, which corresponds to the current biometric ID, in the biometrics database as the second preset identification, deletes the biological feature corresponding to the current biometric ID, sets the deleting result as that deletion is successful, returns the deleting result to the virtual machine, and the virtual machine executes Step d6; if the current biometric ID is not found from all of the biometrics database, sets the deleting result as that the deletion fails, returns the deleting result to the virtual machine, and the virtual machine executes Step d6;

Step d6, the virtual machine determines whether the biometrics verification module deletes the biological feature corresponding to the current biometric ID, if yes, goes to Step d7; otherwise, reports an error to the current wallet, and ends the process;

Step d7, the virtual machine sets the biometrics register result identification, which corresponds to the current biometric ID, in the biometrics-register-result list corresponding to the current wallet applet as the second preset identification, and, Step d8, the virtual machine sets the next biometric ID to the current biometric ID, which is in the biometrics-register-result list corresponding to the current wallet applet as the current biometric ID, and returns to Step d2.

In Embodiment 1, the method for verifying the identity of the holder of the hardware wallet can further include:

Step f1, in the case receiving the deleting request including the current biometric ID from the current wallet applet, the virtual machine determines whether the biometrics input result identification, which corresponds to the current biometric ID, in the biometrics-register-result list corresponding to the current wallet applet is the first preset identification, if yes, goes to Step f2; otherwise, reports an error to the current wallet applet, and ends the process;

Step f2, the virtual machine sends the deleting request including the current biometric ID to the biometrics verification module;

Step f3, the biometrics verification module searches for the current biometric ID from the biometrics database itself, sets the biometrics input result identification, which corresponds to the current biometric ID, in the biometrics database as the second preset identification in the case that the current biometric ID is found, deletes the biological feature corresponding to the current biometric ID, sets the deleting result as that the deletion is successful, sends the deleting result to the virtual machine, and the virtual machine executes Step f4; sets the deleting result as that the deletion fails, returns the deleting result to the virtual machine, and the virtual machine executes Step f4;

Step f4, the virtual machine determines whether the biometrics verification module deletes the biological feature corresponding to the current biometric ID according to the deleting result, if yes, goes to Step f5; otherwise, reports an error to the current wallet applet, and ends the process;

Step f5, the virtual machine sets the biometrics input result identification, which corresponds to the current biometric ID, in the biometrics-register-result list corresponding to the current wallet applet as the second preset identification; returns the information that the deletion is successful to the current wallet applet, and ends the current process.

Furthermore, after the virtual machine receives the deleting request including the current biometric ID from the current wallet applet, before Step f1, the method further includes: the virtual machine searches for the current biometric ID from the biometrics-register-result list corresponding to the current wallet applet, executes Step f1 in the case that the current biometric ID is found; otherwise, reports an error to the current wallet applet, and ends the current operation.

Embodiment 1 provides a method for verifying an identity of a holder of a hardware wallet and a hardware wallet, the hardware wallet includes virtual machine, biometrics verification module and a multiple wallet applets, each of which stores one private key, the hardware wallet inputs for each wallet applet via the virtual machine and the biometrics verification module the biometric feature of the hardware wallet holder corresponding to each wallet applet for verifying the identity, only if the identity verification of the hardware wallet holder corresponding to the current wallet applet is passed, the digital cash can be traded using the private key in the current wallet applet, so as to improve the security protection mechanism of the digital cash and realize the identity verification management of the multiple wallet applets.

Embodiment 2

It provides a method for verifying an identity of a holder of a hardware wallet according to Embodiment 2, as shown in FIG. 2 to FIG. 3, including:

Referring to FIG. 2, the following reference numbers may be explained as:

104: the virtual machine determines whether the fingerprint input result identification, which corresponds to the fingerprint ID in the registering-fingerprint request, in the fingerprint management storage area corresponding to the current wallet applet is the first preset identification;

105: the virtual machine determines whether the fingerprint input identification, which corresponds to the fingerprint ID, in the fingerprint database of the fingerprint module is the first preset identification;

111: the virtual machine obtains the applet identification of the current wallet applet, and detects whether the fingerprint management storage area corresponding to the current wallet applet is initialized according to the applet identification;

115: the virtual machine receives the second verification result from the fingerprint module, and determines whether the fingerprint verifies successfully according to the second verification result;

116: the virtual machine determines whether the fingerprint input result indentification, which corresponds to the fingerprint ID, in the applet fingerprint list corresponding to the current wallet applet is the first preset identification.

Referring to FIG. 3, the following reference numbers may be explained as:

119: the virtual machine obtains the applet identification of the current wallet applet, and detects whether the fingerprint management storage area corresponding to the current wallet applet is initialized according to the applet identification 123: the virtual machine obtains the applet identification of the current wallet applet, and detects whether the fingerprint management storage area corresponding to the current wallet applet is initialized according to the applet identification 127: the virtual machine determines whether the fingerprint input result identification, which corresponds to the current fingerprint ID, in the fingerprint management storage area corresponding to the current wallet applet is the first preset identification 132: the virtual machine obtains the applet identification of the current wallet applet, and detects whether the fingerprint management storage area corresponding to the current wallet applet is initialized according to the applet identification 135: the virtual machine determines whether the fingerprint input result identification, which corresponds to the current fingerprint ID in the fingerprint management storage area correspondin to the current wallet applet is the first preset identification In Embodiment 2, the hardware wallet includes one or a multiple of wallet applets, a virtual machine and a biometrics verification module. In Embodiment 2, a fingerprint module is taken as an example of the biometrics verification module. The biometrics database specifically is the fingerprint database; the biometrics-register-result list specifically is an applet fingerprint list.

Step 101, the virtual machine receives a request from the current wallet applet, goes to Step 102 in the case that the request received is a register fingerprint request; goes to Step 111 in the case that the request received is a first verification fingerprint request; goes to Step 118 in the case that the request received is a query fingerprint list request; goes to Step 123 in the case that the request received is a clearing up fingerprint request; goes to Step 132 in the case that the request received is a deleting fingerprint request;

It needs to be noted that before Step 101, the method further includes: the virtual machine receives an activate request, which comprises an activating wallet applet instruction and an applet identification of a wallet applet, from the upper computer, activates the wallet applet corresponding to the applet identification according to the activating wallet applet instruction, and makes the wallet applet corresponding to the applet identification as the current wallet applet, and stores the applet identification of the current wallet applet, and waits for receiving a fingerprint management request from the current wallet applet.

In Embodiment 2, it further includes: in the case that the current wallet applet receives a transaction request including transaction data from the upper computer, the current wallet applet sends a first verification request to the virtual machine, waits for receiving a first verification result returned from the virtual machine; in which, the transaction data includes a key derive path; the current wallet applet determines whether the first verification result is a fingerprint ID when the first verification result is received from the virtual machine, if yes, signs on the transaction data and an account address corresponding to the key derive path by using a private key corresponding to the key derive path to generate a transaction voucher, and returns the transaction voucher to the upper computer; otherwise, reports an error to the upper computer.

In Embodiment 2, the hardware wallet includes one or a multiple of wallet applets, each applet identification is the unique identified identification of each wallet applet. For example, a hardware wallet includes three wallet applets which are a first wallet applet, a second wallet applet and a third wallet applet, wherein, the applet identification of the first wallet applet is the applet identification 1, the applet identification of the second wallet applet is the applet identification 2, the applet identification of the third wallet applet is the applet identification 3.

In Embodiment 2, the upper computer can be but not limited to PCs or cell phones.

Step 102, the virtual machine obtains the applet identification of the current wallet applet, and determines whether a fingerprint management storage area corresponding to the current wallet applet is initialized according to applet identification, if yes, goes to Step 104; otherwise, goes to Step 103;

Specifically, the virtual machine obtains the applet identification of the current wallet applet, and determines whether the fingerprint management storage area corresponding to the current wallet applet is empty according to the applet identification, if yes, the fingerprint management storage area corresponding to the current wallet applet is not initialized, goes to Step 103; otherwise, the fingerprint management storage area is initialized by the current wallet applet, and goes to Step 104.

For instance, in the case that the virtual machine obtains the applet identification 1 of the current wallet applet, the virtual machine determines whether the fingerprint management storage area corresponding to the first wallet applet is empty according to the applet identification 1, if yes, the fingerprint management storage area corresponding to the first wallet applet is not initialized, goes to Step 103; otherwise, the fingerprint management storage area corresponding to the first wallet applet is initialized, and goes to Step 104.

In the case that the virtual machine obtains the applet identification 2 of the current wallet applet, the virtual machine determines whether the fingerprint management storage area corresponding to the second wallet applet is empty according to the applet identification 2, if yes, the fingerprint management storage area corresponding to the second wallet applet is not initialized, goes to Step 103; otherwise, the fingerprint management storage area corresponding to the second wallet applet is initialized, and goes to Step 104.

Step 103, the virtual machine initializes the fingerprint management storage area corresponding to the current wallet applet;

Specifically, the virtual machine initializes a fingerprint ID and a fingerprint input result identification corresponding to the fingerprint ID, and stores the fingerprint ID and the finger input result identification corresponding to the fingerprint ID into the fingerprint management storage area corresponding to the current wallet applet.

For instance, in the case that the current wallet applet is the first wallet applet, the virtual machine initializes fingerprint ID0-fingerprint ID83, and initializes the fingerprint input result identification corresponding to the fingerprint ID as the second preset identification; the fingerprint ID and the fingerprint result input identification corresponding to the fingerprint ID are stored in the fingerprint management storage area corresponding to the first wallet applet to obtain the applet fingerprint list as shown as table 1. In Embodiment 2, preferably, the second preset identification is 0.

TABLE 1

| | Fingerprint ID | | |
|---|---|---|---|
| | Fingerprint ID0 | Fingerprint ID1 | ... Fingerprint ID83 |
| The finger input result identification | 0 | 0 | ... 0 |

In the case that the current wallet applet is the second wallet applet, the virtual machine initializes the fingerprint ID1-finger ID83, the fingerprint input result identification corresponding to the fingerprint ID is initialized as the second preset identification; the fingerprint ID and the fingerprint input identification corresponding to the fingerprint ID are stored into the fingerprint management storage area corresponding to the second wallet applet to obtain the applet fingerprint list as shown as table 2.

TABLE 2

| | Fingerprint ID | | |
|---|---|---|---|
| | Fingerprint ID0 | Fingerprint ID1 ... | Fingerprint ID83 |
| The finger input result identification | 0 | 0 ... | 0 |

It needs to be noted that table 1 and table 2 in Embodiment 2 are just one form which indicates a corresponding relation between the fingerprint ID and the fingerprint input result identification; the form which indicates the corresponding relation between the fingerprint ID and the fingerprint input result identification can be but not limit to that of table 1 and table 2.

Step 104, the virtual machine determines whether the fingerprint input result identification, which corresponds to the fingerprint ID in the registering-fingerprint request, in the fingerprint management storage area corresponding to the current wallet applet is the first preset identification, if yes, goes to Step 106; otherwise, goes to Step 105;

In Embodiment 2, preferably, the first preset identification is 1.

Step 105, the virtual machine determines whether the fingerprint input identification, which corresponds to the fingerprint ID, in the fingerprint database of the fingerprint module is the first preset identification, if yes, reports an error to the current wallet applet, and returns to Step 101; otherwise, goes to Step 106;

Step 105 specifically includes: Step 1051, the virtual machine sends a first looking up request including the fingerprint ID to the fingerprint module;

Step 1052, the fingerprint module looks up the fingerprint input result identification corresponding to the fingerprint ID from the fingerprint database itself and determines whether the fingerprint input result identification is the first preset identification according to the fingerprint ID in the first looking up request, if yes, sets a first looking up result as success, and goes to Step 1053; otherwise, sets the first looking up result as failure, and goes to Step 1053;

In Embodiment 2, before Step 1052, the method further includes that the fingerprint module powers on and initializes, specifically, after powering on, the fingerprint module initializes the fingerprint database, and initializes a chip fingerprint list including the fingerprint ID and the fingerprint input result corresponding to the fingerprint ID in the fingerprint database itself.

For instance, after powering on, the fingerprint module initializes the fingerprint database, the fingerprint module initializes fingerprint ID0-fingerprint ID83, and initializes the fingerprint input result identification corresponding the fingerprint ID as the second preset identification; the fingerprint ID and the fingerprint result input identification corresponding to the fingerprint ID are stored into the fingerprint database of the fingerprint module to obtain the chip fingerprint list as shown as Table 3.

TABLE 3

| | Fingerprint ID | | |
|---|---|---|---|
| | Fingerprint ID0 | Fingerprint ID1 ... | Fingerprint ID83 |
| The finger input result identification | 0 | 0 ... | 0 |

It needs to be noted that table 3 in Embodiment 2 is just a form which indicates the corresponding relation between the fingerprint ID and the fingerprint input result identification, the forms which indicate the corresponding relation between the fingerprint ID and the fingerprint input result identification can be but not limit to a table shown as table 3.

Step 1053, the fingerprint module sends the first looking up result to the virtual machine;

Step 1054, the virtual machine determines whether the fingerprint input result identification, which corresponds to the fingerprint ID, in the fingerprint database of the fingerprint module is the first preset identification according to the first looking up result, if yes, reports an error to the current wallet applet, and returns to Step 101; otherwise, goes to Step 106;

Step 106, the virtual machine sends an inputting fingerprint request including the fingerprint ID and the number of times of input in the registration request to the fingerprint module; and receives an inputting result from the fingerprint module.

After receiving the inputting request which includes the fingerprint ID and the number of times of input in the registration request from the virtual machine, the fingerprint module prompts a user to input a fingerprint, sets the inputting result as failure in the case that no fingerprint of the user is detected, and returns the inputting result to the virtual machine; obtains a fingerprint feature according to the fingerprint input by the user in the case that the fingerprint input by the user is detected, and builds a corresponding relation of the fingerprint feature with the fingerprint ID and the number of times of input, and the fingerprint module determines whether the number of times of input is the preset limited number, if yes, sets the fingerprint input result identification, which corresponds to the fingerprint ID, in the fingerprint database itself as the first preset identification, and stores the fingerprint feature corresponding to the fingerprint ID and each number of times of input into the fingerprint database, and sets the inputting result as success, and returns the inputting result to the virtual machine; otherwise, sets the inputting result as success, and returns the inputting result to the virtual machine.

Or, after receiving the inputting fingerprint request from the virtual machine, the fingerprint module sets the inputting result as failure in the case that no fingerprint input by the user is detected, and returns the inputting result to the virtual machine; the fingerprint module obtains the fingerprint feature according to the fingerprint input by the user in the case that the fingerprint input by the user is detected, and builds the corresponding relation of the fingerprint ID with the fingerprint ID and the number of times of input, and sets the inputting result as success, and determines whether the number of times of input is the preset limited number of times, if yes, sets the fingerprint input result identification, which corresponds to the fingerprint ID, in the fingerprint database of the fingerprint module as the first preset identification, and stores the fingerprint feature corresponding to the fingerprint ID and each number of times of input into the fingerprint database, and returns the inputting result to the virtual machine; otherwise, returns the inputting result to the virtual machine, in which, building the corresponding relation of the fingerprint feature with the number of times of input specifically is setting the number of times of input as an identification of the fingerprint feature, and building the corresponding relation between the fingerprint feature whose identification is set and the fingerprint ID.

For instance, when receiving the inputting fingerprint request which includes the fingerprint ID1 and the number of times of input that is 1 in the registration request from the virtual machine, the fingerprint module prompts the user to input a fingerprint, the fingerprint module obtains the fingerprint feature according to the fingerprint input by the user in the case that the fingerprint input by the user is detected, and sets the number of times of input that is 1 as the identification of the fingerprint feature, and builds the corresponding relation between the fingerprint feature 1 whose identification is set and the fingerprint ID; the fingerprint module sets the inputting result as success in the case that the number of times of input 1 is not the preset limited number of times, and returns the inputting result to the virtual machine.

When receiving the inputting request including the fingerprint ID 1 and the number of times of input 4 in the registration request from the virtual machine, the fingerprint module prompts the user to input a fingerprint, the fingerprint module obtains the fingerprint feature according to the fingerprint input by the user when the fingerprint input by the user is detected, and sets the number of times of input 4 as the identification of the fingerprint feature, and builds the corresponding relation between the fingerprint feature 4 whose identification is set and the fingerprint ID; the fingerprint module sets the fingerprint input result identification, which corresponds to fingerprint ID1, in the fingerprint database itself as the first preset identification in the case that the number of times of input 4 is set as the preset limited number of times to obtain the corresponding updated relation between the fingerprint ID and the fingerprint input result identification as shown as in table 3-1, and stores the fingerprint feature corresponding to the fingerprint ID1 and each number of times of input into the fingerprint database to obtain a table as shown as table 4, and sets the inputting result as success, and sends the inputting result to the virtual machine; otherwise, sets the inputting result as the registration is successful, and sends the inputting result to the virtual machine.

Preferably, the preset limited number of times is 4.

TABLE 3-1

| | Fingerprint ID | | |
|---|---|---|---|
| | Fingerprint ID0 | Fingerprint ID1 | ... Fingerprint ID83 |
| The finger input result identification | 0 | 1 | ... 0 |

TABLE 4

| Fingerprint ID | Fingerprint ID1 | | | | |
|---|---|---|---|---|---|
| Fingerprint feature | Fingerprint feature 1 | Fingerprint feature 2 | Fingerprint feature 3 | Fingerprint feature 4 | |

It needs to be noted that Table 4 in Embodiment 2 is just a form which indicates the corresponding relation of the fingerprint feature with the fingerprint ID and the number of times of input, the form which indicates the corresponding relation of the fingerprint feature with the fingerprint ID and the number of times of input in Embodiment 2 can be but not limited to a table shown as table 4.

In Embodiment 2, the fingerprint feature 1, the fingerprint feature 2, the fingerprint feature 3 and the fingerprint feature 4, which correspond to the fingerprint ID1, can be as same as each other or some of them are as same as each other or be different from each other. For instance, all of the fingerprint feature 1, the fingerprint feature 2 and the fingerprint feature 3 can correspond to the forefinger of the user, meanwhile, the fingerprint feature 4 corresponds to the middle finger of the user.

Step 107, the virtual machine determines whether the fingerprint module obtains the fingerprint feature successfully according to the inputting result, if yes, goes to Step 108; otherwise, reports an error to the current wallet applet, and returns to Step 101;

Step 108, the virtual machine determines whether the number of times of input is the preset limited number of times, if yes, goes to Step 109; otherwise, goes to Step 110;

Step 109, the virtual machine sets the fingerprint input result identification, which corresponds to the fingerprint ID, in the fingerprint management storage area corresponding to the current wallet applet as the first preset identification;

For instance, the virtual machine sets the fingerprint input result identification, which corresponds to the fingerprint ID1, in the fingerprint management storage area corresponding to the first wallet applet as the first preset identification to obtain the updated corresponding relation between the fingerprint ID and the fingerprint input result identification as shown in table 1-1.

TABLE 1-1

| | Fingerprint ID | | |
|---|---|---|---|
| | Fingerprint ID0 | Fingerprint ID1 | ... Fingerprint ID83 |
| The finger input result identification | 0 | 1 | ... 0 |

Step 110, the virtual machine returns the fingerprint ID to the current wallet applet, and returns to Step 101.

In Embodiment 2, a fingerprint storage area is allocated for each wallet applet in the virtual machine correspondingly, each fingerprint storage area stores the corresponding relation between the fingerprint ID corresponding to each wallet applet and the fingerprint input result identification, the fingerprint database of the fingerprint module stores the corresponding relation between the fingerprint ID corresponding to all of the wallet applets and the fingerprint input result identification and the corresponding relation of fingerprint feature corresponding to the all of the wallet applets with the fingerprint ID and the number of times of input. For instance, after receiving the registering fingerprint request, which includes the fingerprint ID1 and the number of times of input which is the limited number of times, from the first wallet applet, and after the fingerprint corresponding to the fingerprint ID1 is registered, the corresponding relation between the fingerprint ID in the fingerprint management storage area corresponding to the first wallet applet and the fingerprint input result identification in the virtual machine can be as shown as in Table 1-1, the corresponding relation between the fingerprint ID in the database of the fingerprint module and the fingerprint input result identification can be as shown as in table 3-1; the corresponding relation of the fingerprint feature with the fingerprint ID and the number of times of input is as shown as Table 4. After receiving the registering fingerprint request, which includes the fingerprint ID1 and the number of times of input which is the limited number of times, from the first wallet applet, and after the fingerprint corresponding to the fingerprint ID1 is registered, the virtual machine re-executes Step 101-110, after the fingerprint corresponding to the fingerprint ID0 is registered, the corresponding relation between the fingerprint ID in the fingerprint management storage area corresponding to the second wallet applet and the fingerprint input result identification in the virtual machine can be as shown as in table 2-1; the fingerprint module updates again the corresponding relation between the fingerprint ID in the database and the fingerprint input result identification to obtain the list as shown as Table 3-2; the fingerprint module updates the corresponding relation between the fingerprint feature with the fingerprint ID and the number of times of input to obtain the list as shown as Table 4-1.

TABLE 2-1

| | Fingerprint ID | | |
| --- | --- | --- | --- |
| | Fingerprint ID0 | Fingerprint ID1 | ... Fingerprint ID83 |
| The finger input result identification | 1 | 0 | ... 0 |

TABLE 3-2

| | Fingerprint ID | | |
| --- | --- | --- | --- |
| | Fingerprint ID0 | Fingerprint ID1 | ... Fingerprint ID83 |
| The finger input result identification | 1 | 1 | ... 0 |

TABLE 4-1

| Fingerprint ID | Fingerprint ID1 | | | |
| --- | --- | --- | --- | --- |
| Fingerprint feature | Fingerprint feature 1 | Fingerprint feature 2 | Fingerprint feature 3 | Fingerprint feature 4 |

In Embodiment 2, the fingerprint feature 1, the fingerprint feature 2, the fingerprint feature 3 and the fingerprint feature 4, which correspond to the fingerprint ID0, can be as same as each other or some of them are as same as each other or be different from each other. For instance, all of the fingerprint feature 1, the fingerprint feature 2 and the fingerprint 3 corresponding to ID0 can correspond to the forefinger of the user, meanwhile, the fingerprint feature 4 corresponds to the middle finger of the user.

Step 111, the virtual machine obtains the applet identification of the current wallet applet, and detects whether the fingerprint management storage area corresponding to the current wallet applet is initialized according to the applet identification, if yes, goes to Step 113; otherwise, goes to Step 112;

Step 112, the virtual machine initializes the fingerprint management storage area corresponding to the current wallet applet;

Step 113, the virtual machine obtains the applet fingerprint list including the fingerprint ID and the fingerprint input result identification corresponding to the fingerprint ID from the fingerprint management storage area corresponding to the current wallet applet;

For instance, the virtual machine obtains the applet fingerprint list as shown as Table 1-1, which includes the fingerprint ID and the fingerprint input result identification corresponding to the fingerprint ID, from the fingerprint management storage area corresponding to the first wallet applet.

Step 114, the virtual machine sends the second verification fingerprint request including the applet fingerprint list to the fingerprint module;

After receiving the second verification request including the applet fingerprint list from the virtual machine, the fingerprint module prompts the user to input fingerprint, obtains the fingerprint feature corresponding to the fingerprint input by the user when the fingerprint input by the user is detected, and looks up the fingerprint ID, which corresponds to the fingerprint feature and whose fingerprint input identification is the first preset identification, from the applet fingerprint list, if the fingerprint ID is found, makes the fingerprint ID as the second verification result and sends the result to the virtual machine; if the fingerprint ID is not found, makes that the verification is failure as the second verification result and sends the result to the virtual machine; if no fingerprint is detected, makes that the verification is failure as the second verification result and sends the result to the virtual machine.

For instance, after receiving the second verification request including the applet fingerprint list as shown as table 1-1 from the virtual machine, the fingerprint module prompts the user to input the fingerprint, when the fingerprint input by the user is detected, obtains the fingerprint feature corresponding to the forefinger input by the user, and looks up the fingerprint feature 1, the fingerprint feature 2 and the fingerprint feature 3 corresponding to the forefinger from the table 1-1, and if the input result identification of the fingerprint ID1 is the first preset identification, the fingerprint ID1 is made as the verification result and sent to the virtual machine.

Step 115, the virtual machine receives the second verification result from the fingerprint module, and determines whether the fingerprint verifies successfully according to the second verification result, if yes, goes to Step 116; otherwise, makes the verification is failure as the first verification result, and goes to Step 117;

Specifically, the virtual machine receives the second verification result from the fingerprint module, and determines whether the second verification result is the fingerprint ID, if yes, the fingerprint module verifies successfully, goes to Step 116; otherwise, reports an error to the current wallet, and returns to Step 101.

Step 116, the virtual machine determines whether the fingerprint input result identification, which corresponds to the fingerprint ID, in the applet fingerprint list corresponding to the current wallet applet is the first preset identification, if yes, makes the fingerprint ID as the first verification result, goes to Step 117; otherwise, makes the verification is failure as the first verification result, goes to Step 117;

Step 117, the virtual machine returns the first verification result to the current wallet applet, and returns to Step 101.

The technological means used in the method for verifying the identity of the holder of the hardware wallet in Embodiment 2 include that the virtual machine sends the second verification fingerprint request including the applet fingerprint list to the fingerprint module, the fingerprint module prompts the user to input a fingerprint after the second verification request including the applet fingerprint list is received from the virtual machine, when the fingerprint input by the user is detected, the fingerprint ID, which corresponds to the fingerprint feature and whose fingerprint input identification is the first preset identification is looked up from the applet fingerprint list, if the fingerprint ID is found, makes the fingerprint ID as the verification result and sends to the virtual machine; if the fingerprint ID is not found, makes the verification is failure as the verification result and sends to the virtual machine. In this way, during the process of verifying a fingerprint of the current wallet applet by the virtual machine, it will not happen that after the user registers the fingerprint for a multiple of wallets applets by using one finger, when the user has the fingerprint of the said finger to be verified, the fingerprint module may return the fingerprint ID of wallet applet other than that of the current wallet applet to the virtual machine if the fingerprint module returns the fingerprint ID to the virtual machine according to the corresponding relation between the fingerprint ID in the fingerprint database itself and the fingerprint feature of the said finger; when Step 116 is executed, the virtual machine reports an error to the current wallet applet, thus the fingerprint is verified unsuccessfully, it makes the user feel bad.

For instance, after the user registers the fingerprint of the forefinger for the first wallet applet and the second wallet applet, if the current applet is the first wallet applet, during the process of verifying the fingerprint of the first wallet applet by the virtual machine, in the case that the user uses the finger to verifying the fingerprint, the fingerprint module found the fingerprint ID0 corresponding to the fingerprint feature 4 corresponding to the forefinger from the corresponding relation between the fingerprint ID and the fingerprint feature as shown in Table 4-1 of the database, returns the fingerprint ID0 to the virtual machine; when Step 116 is executed, the virtual machine determines that the fingerprint input result identification, which corresponds to the fingerprint ID, in the applet fingerprint list as shown in table 1-1 corresponding to the first wallet applet is not the first preset identification, the virtual machine reports an error to the first wallet applet, it makes the user feel bad.

Step 118, the virtual machine obtains the smallest available fingerprint ID from the fingerprint module;

Step 118 specifically includes that the virtual machine sends an obtaining the smallest available fingerprint ID request to the fingerprint module; and receives the smallest available fingerprint ID from the fingerprint module.

After receiving the obtaining the smallest available fingerprint ID request from the virtual machine, the fingerprint module found the smallest available fingerprint ID from the fingerprint database itself, and sends the smallest available fingerprint ID to the virtual machine.

Specifically, after receiving the obtaining the smallest available fingerprint ID request from the virtual machine, the fingerprint module looks up the smallest fingerprint ID whose fingerprint input identification is the second preset identification from the fingerprint database itself, if found, makes the fingerprint ID as the smallest available fingerprint and sends to the virtual machine; otherwise, reports an error to the virtual machine.

Step 119, the virtual machine obtains the applet identification of the current wallet applet, and detects whether the fingerprint management storage area corresponding to the current wallet applet is initialized according to the applet identification, if yes, goes to Step 121; otherwise, goes to Step 120;

Step 120, the virtual machine initializes the fingerprint management storage area corresponding to current wallet applet, and goes to Step 121;

Step 121, the virtual machine obtains the applet fingerprint list including the fingerprint ID and the fingerprint input result identification corresponding to fingerprint ID from the fingerprint management storage area corresponding to the current wallet applet;

Step 122, the virtual machine returns the applet fingerprint list and the smallest available fingerprint ID to the current wallet applet, and returns to Step 101.

Step 123, the virtual machine obtains the applet identification of the current wallet applet, and detects whether the fingerprint management storage area corresponding to the current wallet applet is initialized according to the applet identification, if yes, goes to Step 125; otherwise, goes to Step 124;

Step 124, the virtual machine initializes the fingerprint management storage area corresponding to the current wallet applet;

Step 125, the virtual machine makes the first fingerprint ID in the fingerprint management storage area corresponding to the current wallet applet as the current fingerprint ID;

Step 126, the virtual machine determines whether the current fingerprint ID is beyond the preset limited scope, if yes, goes to Step 131; otherwise, goes to Step 127;

Step 127, the virtual machine determines whether the fingerprint input result identification, which corresponds to the current fingerprint ID, in the fingerprint management storage area corresponding to the current wallet applet is the first preset identification, if yes, goes to Step 128; otherwise, makes the next fingerprint ID of the current fingerprint ID in the fingerprint management storage area corresponding to the current wallet applet as the current fingerprint ID, and returns to Step 126;

Step 128, the virtual machine sends the deleting request to the fingerprint module according to the current fingerprint ID; receives the deleting result from the fingerprint module;

After receiving the deleting request from the virtual machine, the fingerprint module sets the fingerprint input result identification, which corresponds to the current fingerprint ID in the fingerprint database as the second preset identification, deletes each fingerprint feature corresponding to the current fingerprint ID, and sets the deleting result as the deletion is successful, and returns the deleting result to the virtual machine. In the case that the fingerprint module does not find the current fingerprint ID from the database after receiving the deleting request from the virtual machine, sets the deleting result as the deletion is failure, and returns the deleting result to the virtual machine.

Step 129, the virtual machine determines whether the fingerprint module deletes the fingerprint feature corresponding to the current fingerprint ID according to the deleting result, if yes, goes to Step 130; otherwise, reports an error to the current wallet applet, and returns to Step 101;

Step 130, the virtual machine sets the fingerprint input result identification, which corresponds to the current fingerprint ID in the fingerprint management storage area corresponding to the current wallet applet as the second preset identification, and makes the next fingerprint ID of the current fingerprint ID in the fingerprint management storage area corresponding to the current wallet applet as the current fingerprint ID, and returns to Step 126;

Step 131, the virtual machine returns the clearing up successful information to the current wallet applet, and returns to Step 101;

Step 132, the virtual machine obtains the applet identification of the current wallet applet, and detects whether the fingerprint management storage area corresponding to the current wallet applet is initialized according to the applet identification, if yes, goes to Step 134; otherwise, goes to Step 133;

Step 133, the virtual machine initializes the fingerprint management storage area corresponding to the current wallet applet;

Step 134, the virtual machine determines whether the current fingerprint ID in the deleting fingerprint request is stored into the fingerprint management storage area corresponding to the current wallet applet, if yes, goes to Step 135; otherwise, reports an error to the current wallet applet, and returns to Step 101;

Step 135, the virtual machine determines whether the fingerprint input result identification, which corresponds to the current fingerprint ID in the fingerprint management storage area corresponding to the current wallet applet is the first preset identification, if yes, goes to Step 136; otherwise, reports an error to the current wallet applet, and returns to Step 101;

Step 136, the virtual machine sends the deleting request to the fingerprint module according to the current fingerprint ID, and receiving the deleting result from the fingerprint module;

After receiving the deleting request from the virtual machine, the fingerprint module sets the fingerprint input result identification, which corresponds to the current fingerprint ID in the fingerprint database as the second preset identification, deletes each fingerprint feature corresponding to the current fingerprint ID, and sets the deleting result as the deletion is successful, and returns the deleting result to the virtual machine. In the case that the fingerprint module does not find the current fingerprint ID from the database after receiving the deleting request from the virtual machine, sets the deleting result as the deletion is failure, and returns the deleting result to the virtual machine.

Step 137, the virtual machine determines whether the fingerprint module deletes the fingerprint feature corresponding to the current fingerprint ID according to the deleting result, if yes, goes to Step 138; otherwise, reports an error to the current wallet applet, and returns to Step 101;

Step 138, the virtual machine sets the fingerprint input result identification, which corresponds to the current fingerprint ID, in the fingerprint management storage area corresponding to the current applet as the second preset identification;

Step 139, the virtual machine returns the deleting successful information to the current wallet applet, and returns to Step 101.

Figure 4:
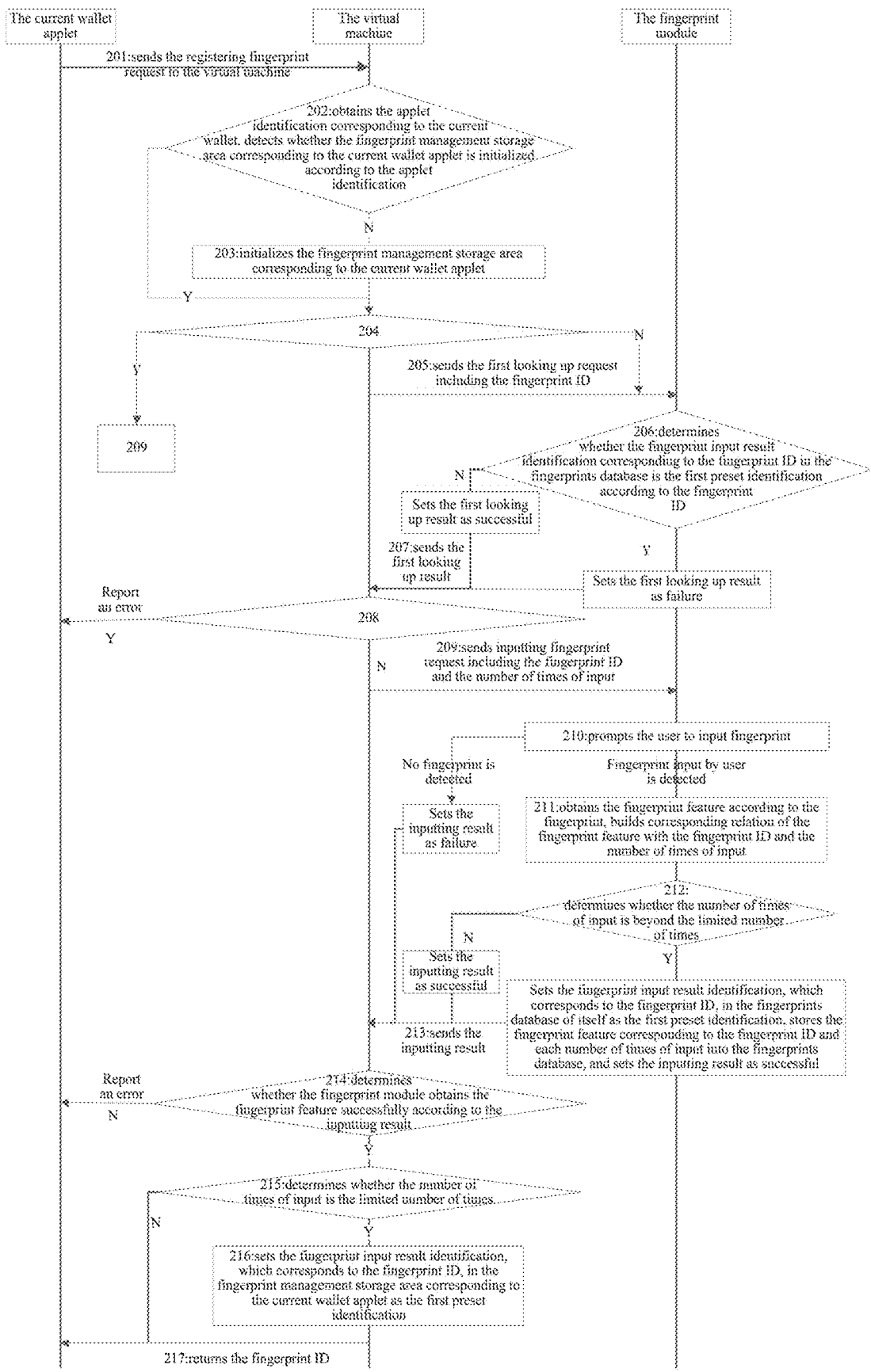

It also provides a method for verifying the identity of the holder of the hardware wallet according to Embodiment 2, in which, the hardware wallet includes the wallet applet, the virtual machine and the fingerprint module, said method includes a fingerprint registration process, a fingerprint verification process, a fingerprint list querying process, the fingerprint clearing up process and the fingerprint deleting process, in which, the fingerprint registration process, as shown in FIG. 4, includes:

Referring to FIG. 4, the following reference numbers may be explained as:

204: the virtual machine determines whether the fingerprint input result identification, which corresponds to the fingerprint ID in the registering fingerprint request, in the fingerprint management storage area corresponding to the current wallet applet is the first preset identification;

208: the virtual machine determines whether the fingerprint input result identification, which corresponds to the fingerprint ID, in the fingerprint database of the fingerprint is the first preset identification according to the first looking up result.

Step 201, the current wallet applet sends the registering fingerprint request to the virtual machine;

It needs to be noted that before Step 201, the process further includes that the virtual machine receives the activate request including the activating wallet applet instruction and the applet identification of the current applet from the upper computer, and activates the wallet applet corresponding to the applet identification according to the activating wallet applet instruction, and makes the wallet applet corresponding to the applet identification as the current wallet applet, and stores the applet identification of the current wallet applet, and waits for receiving the fingerprint management request from the current wallet applet. In Embodiment 2, the fingerprint management request includes the registering fingerprint request, the verifying fingerprint request, the querying fingerprint list request, the clearing up fingerprint request and the deleting fingerprint list request.

In Embodiment 2, the hardware wallet includes one or a multiple of wallet applets, the applet identification is the unique identification of each wallet applet. For instance, a hardware wallet includes three wallet applets which are a first wallet applet, a second wallet applet and a third wallet applet, wherein, the applet identification of the first wallet applet is the applet identification 1, the applet identification of the second wallet applet is the applet identification 2, the applet identification of the third wallet applet is the applet identification 3.

Step 202, the virtual machine obtains the applet identification of the current wallet applet, and detects whether the fingerprint management storage area corresponding to the current wallet applet is initialized according to the applet identification, if yes, goes to Step 204; otherwise, goes to Step 203;

Step 203, the virtual machine initializes the fingerprint management storage area corresponding to the current wallet applet;

Step 204, the virtual machine determines whether the fingerprint input result identification, which corresponds to the fingerprint ID in the registering fingerprint request, in the fingerprint management storage area corresponding to the current wallet applet is the first preset identification, if yes, goes to Step 209; otherwise, goes to Step 205;

Step 205, the virtual machine sends the first looking up request including the fingerprint ID to the fingerprint module;

Step 206, the fingerprint module looks up the fingerprint input result identification corresponding to the fingerprint ID from the fingerprint database itself, and determines the fingerprint input result identification is the first preset identification according to the fingerprint ID in the first looking up request, if yes, sets the first looking up result as failure, and goes to Step 207; otherwise, sets the first looking up result as success, and goes to Step 207;

Step 207, the fingerprint module sends the first looking up result to the virtual machine;

Step 208, the virtual machine determines whether the fingerprint input result identification, which corresponds to the fingerprint ID, in the fingerprint database of the fingerprint is the first preset identification according to the first looking up result, if yes, reports an error to the current wallet applet; otherwise, goes to Step 209;

Step 209, the virtual machine sends the inputting fingerprint request including the fingerprint ID and the number of times of input in the registering request to the fingerprint module;

Step 210, the fingerprint module prompts the user to input a fingerprint, and goes to Step 211 if the fingerprint input by the user is detected; sets the inputting result as failure if no fingerprint input by the user is detected, and goes to Step 213;

Step 211, the fingerprint module obtains the fingerprint feature according to the fingerprint input by the user, and builds the corresponding relation of the fingerprint feature with the fingerprint ID and the number of times of input;

Step 212, the fingerprint module determines whether the number of times of input is the limited number of times, if yes, sets the fingerprint input result identification, which corresponds to the fingerprint ID, in the fingerprint database as the first preset identification, stores the fingerprint feature corresponding to the fingerprint ID and each number of times of input into the fingerprint database, sets the inputting result as success, and goes to Step 213; otherwise, sets the inputting result as success, and goes to Step 213;

In Embodiment 2, Step 212 can specifically include: the fingerprint module sets the inputting result as success, and determines whether the number of times of input is the preset limited number of times, if yes, sets the fingerprint input result identification, which corresponds to the fingerprint ID, in the fingerprint database as the first preset identification, and stores the fingerprint feature corresponding to the fingerprint ID and each number of times of input into the fingerprint database, and goes to Step 213; otherwise, goes to Step 213;

Step 213, the fingerprint module sends the inputting result to the virtual machine;

Step 214, the virtual machine determines whether the fingerprint module obtains the fingerprint feature successfully according to the inputting result, if yes, goes to Step 215; otherwise, reports an error to the current wallet applet;

Step 215, the virtual machine determines whether the number of times of input is the preset limited number of times, if yes, goes to Step 216; otherwise, goes to Step 217;

Step 216, the virtual machine sets the fingerprint input result identification, which corresponds to the fingerprint ID, in the fingerprint management storage area corresponding to the current wallet applet as the first preset identification;

Step 217, the virtual machine returns the fingerprint ID to the current wallet applet.

Figure 5:
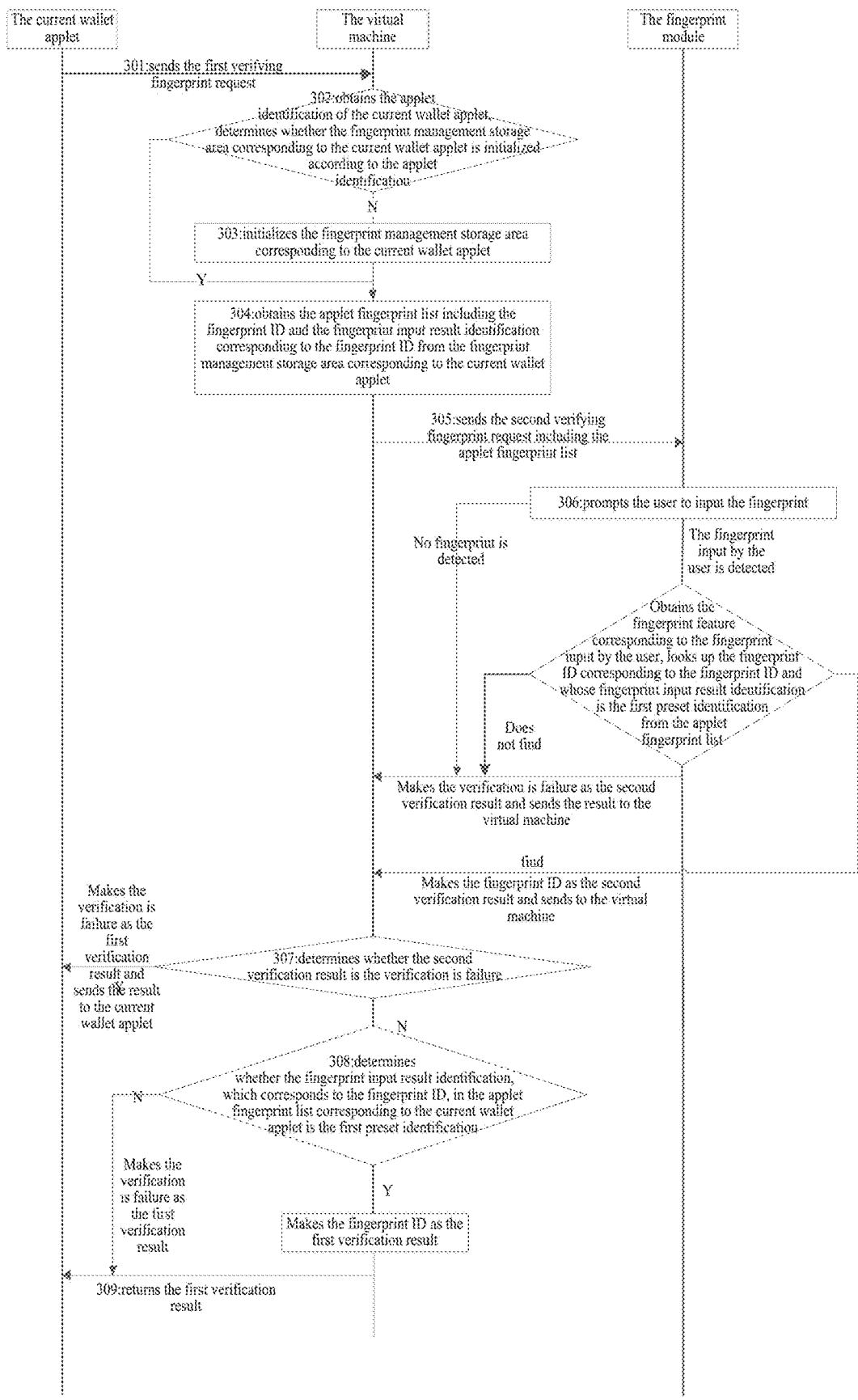

The fingerprint verification process, as shown in FIG. 5, includes:

Step 301, the current wallet applet sends the first verifying fingerprint request to the virtual machine;

Step 302, the virtual machine obtains the applet identification of the current wallet applet, detects whether the fingerprint management storage area corresponding to the current wallet applet is initialized according to the applet identification, if yes, goes to Step 304; otherwise, goes to Step 303;

Step 303, the virtual machine initializes the fingerprint management storage area corresponding to the current wallet applet;

Step 304, the virtual machine obtains the applet fingerprint list including the fingerprint ID and the fingerprint input result identification corresponding to the fingerprint ID from the fingerprint management storage area corresponding to the current wallet applet;

Step 305, the virtual machine sends the second verifying fingerprint request including the applet fingerprint list to the fingerprint module;

Step 306, the fingerprint module prompts the user to input a fingerprint, obtains the fingerprint feature according to the fingerprint input by the user after the fingerprint is detected, looks up the fingerprint ID, which corresponds to the fingerprint feature and whose fingerprint input result identification is the first preset identification, from the applet fingerprint list, if the fingerprint ID is found, makes the fingerprint ID as the second verifying result and sends the result to the virtual machine; if the fingerprint ID is not found, makes the verification is failure as the second verifying result and sends the result to the virtual machine; if no fingerprint input by the user is detected, makes the verification is failure as the second verifying result and sends the result to the virtual machine;

Step 307, the virtual machine determines whether the second verifying result is that the verification is failure, if yes, makes the verification is failure as the first verifying result and sends the result to the current wallet applet; otherwise, goes to Step 308;

Step 308, the virtual machine determines whether the fingerprint input result identification, which corresponds to the fingerprint ID, in the applet fingerprint list corresponding to the current wallet applet is the first preset identification, if yes, makes the fingerprint ID as the first verifying result, and goes to Step 309; otherwise, makes that the verification is failure as the first verifying result, and goes to Step 309;

Step 309, the virtual machine returns the first verifying result to the current wallet applet.

It needs to be noted that before Step 301, the process further includes the current wallet applet receives the transaction request including the transaction data from the upper computer; in which, the transaction data includes the key derive path; correspondingly, after receiving the first verifying result from the virtual machine, the current wallet applet determines whether the first verifying result is that the verification is successful in the case that the first verifying result is the fingerprint ID, if yes, signs on the transaction data and the account address corresponding to the key derive path by using the private key corresponding to the key derive path to generate the transaction voucher, and returns the transaction voucher to the upper computer; otherwise, reports an error to the upper computer.

Figure 6:
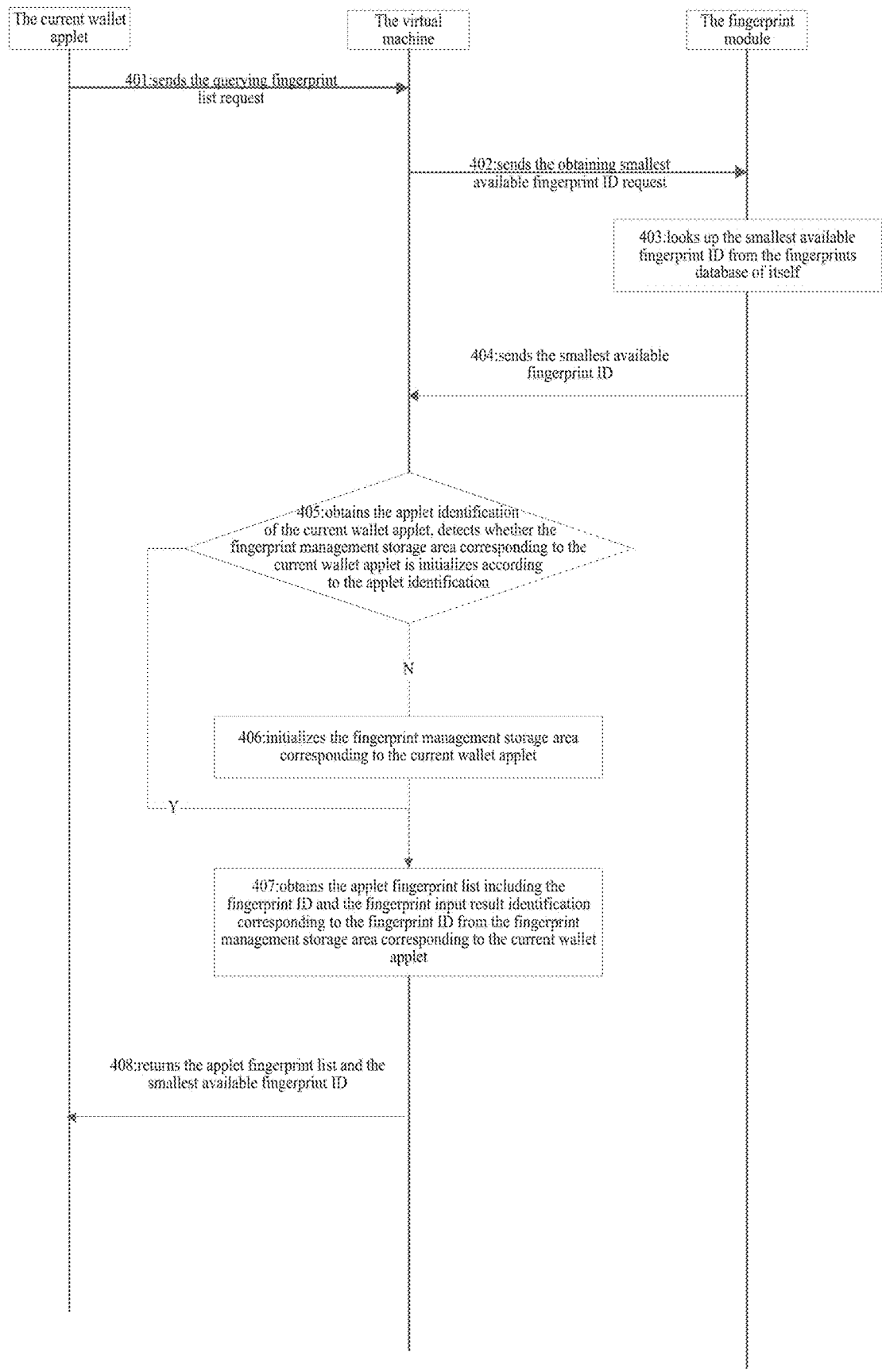

The fingerprint list querying process, as shown in FIG. 6, includes:

Step 401, the current wallet applet sends the querying fingerprint list request to the virtual machine;

Step 402, the virtual machine sends the obtaining the smallest available fingerprint ID request to the fingerprint module;

Step 403, the fingerprint module finds the smallest available fingerprint ID from the fingerprint database itself;

Specifically, the fingerprint module looks up the fingerprint ID whose fingerprint input result identification is the second preset identification and whose value is the smallest from the fingerprint database, if the fingerprint ID is found, makes the fingerprint ID as the smallest fingerprint ID; if the fingerprint ID is not found, reports an error to the virtual machine.

Step 404, the fingerprint module sends the smallest available fingerprint ID to the virtual machine;

Step 405, the virtual machine obtains the applet identification of the current wallet applet, detects whether the fingerprint management storage area, which corresponds to the current wallet applet, is initialized according to the applet identification, if yes, goes to Step 407; otherwise, goes to Step 406;

Step 406, the virtual machine initializes the fingerprint management storage area corresponding to the current wallet applet;

Step 407, the virtual machine obtains the applet fingerprint list including the fingerprint ID and the fingerprint input result identification corresponding to the fingerprint ID from the fingerprint management storage area corresponding to the current wallet applet;

Step 408, the virtual machine returns the applet fingerprint list and the smallest available fingerprint ID to the current wallet applet.

Figure 7:
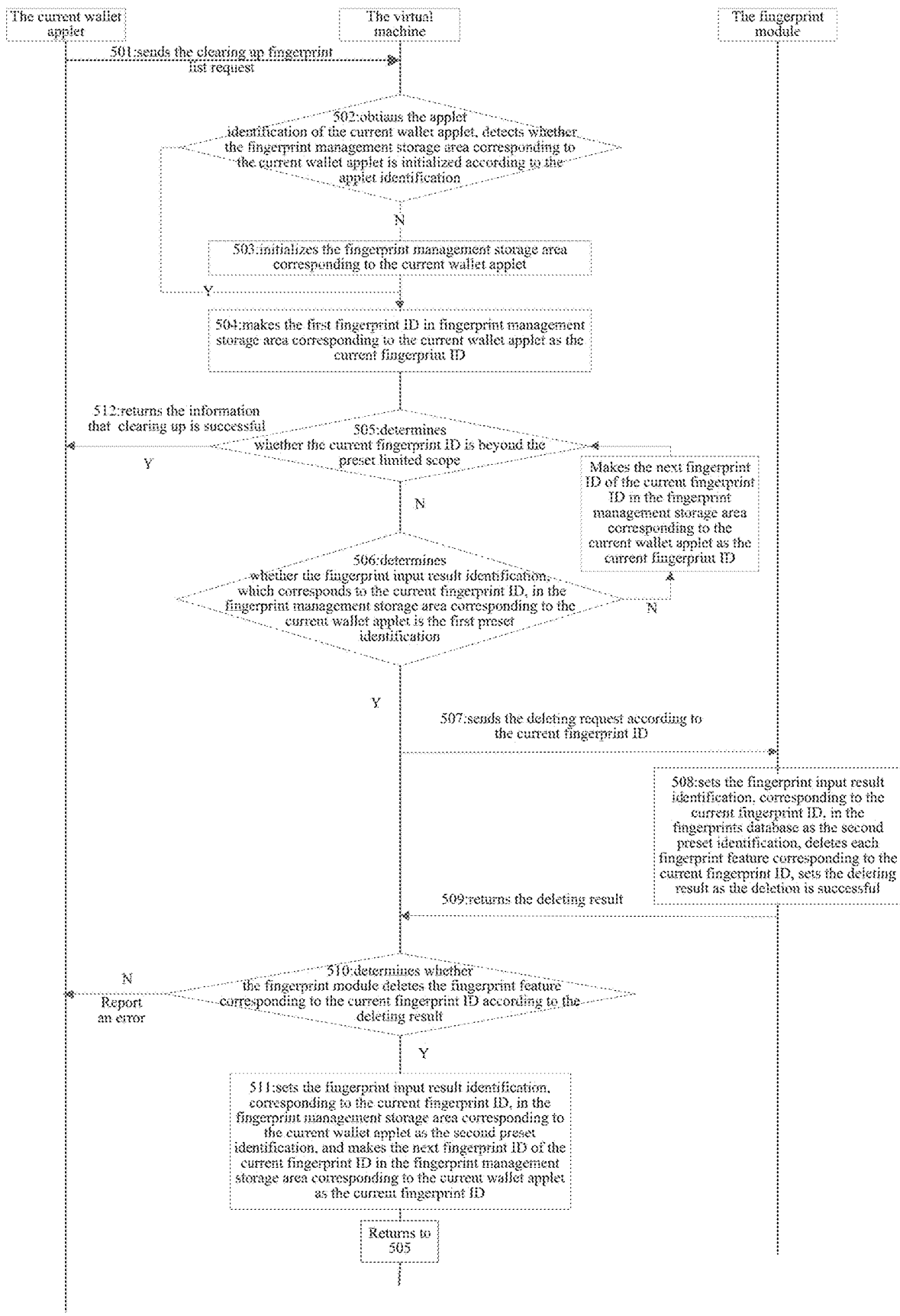

The fingerprint clearing up process, as shown in FIG. 7, includes:

Step 501, the current wallet applet sends the clearing up fingerprint list request to the virtual machine;

Step 502, the virtual machine obtains the applet identification of the current wallet applet, and detects whether the fingerprint management storage area corresponding to the current wallet applet is initialized according to the applet identification, if yes, goes to Step 504; otherwise, goes to Step 503;

Step 503, the virtual machine initializes the fingerprint management storage area corresponding to the current wallet applet;

Step 504, the virtual machine makes the first fingerprint ID in the fingerprint management storage area corresponding to the current wallet applet as the current fingerprint ID;

Step 505, the virtual machine determines whether the current fingerprint ID is beyond the preset limited scope, if yes, goes to Step 512; otherwise goes to Step 506;

Step 506, the virtual machine determines whether the fingerprint input result identification, which corresponds to the current fingerprint ID, in the fingerprint management storage area corresponding to the current wallet applet is the first preset identification, if yes, goes to Step 507; otherwise, makes the next fingerprint ID of the current fingerprint ID in the fingerprint management storage area corresponding to the current wallet applet as the current fingerprint ID, and returns to Step 505;

Step 507, the virtual machine sends the deleting request to the fingerprint module according to the current fingerprint ID;

Step 508, the fingerprint module sets the fingerprint input result identification, which corresponds to the current fingerprint ID, in the fingerprint database as the second preset identification, deletes each fingerprint feature corresponding to the current fingerprint ID, and sets the deleting result as that the deletion is successful;

Step 509, the fingerprint module returns the deleting result to the virtual machine;

Step 510, the virtual machine determines whether the fingerprint module deletes the fingerprint feature corresponding to the current fingerprint ID according to the deleting result, if yes, goes to Step 511; otherwise, reports an error to the current wallet applet;

Step 511, the virtual machine sets the fingerprint input result identification, which corresponds to the current fingerprint ID, in the fingerprint management storage area corresponding to the current wallet applet as the second preset identification, makes the next fingerprint ID of the current fingerprint ID in the fingerprint management storage area corresponding to the current wallet applet as the current fingerprint ID, and returns to Step 505;

Step 512, the virtual machine returns the clearing up successful information to the current wallet applet.

Figure 8:
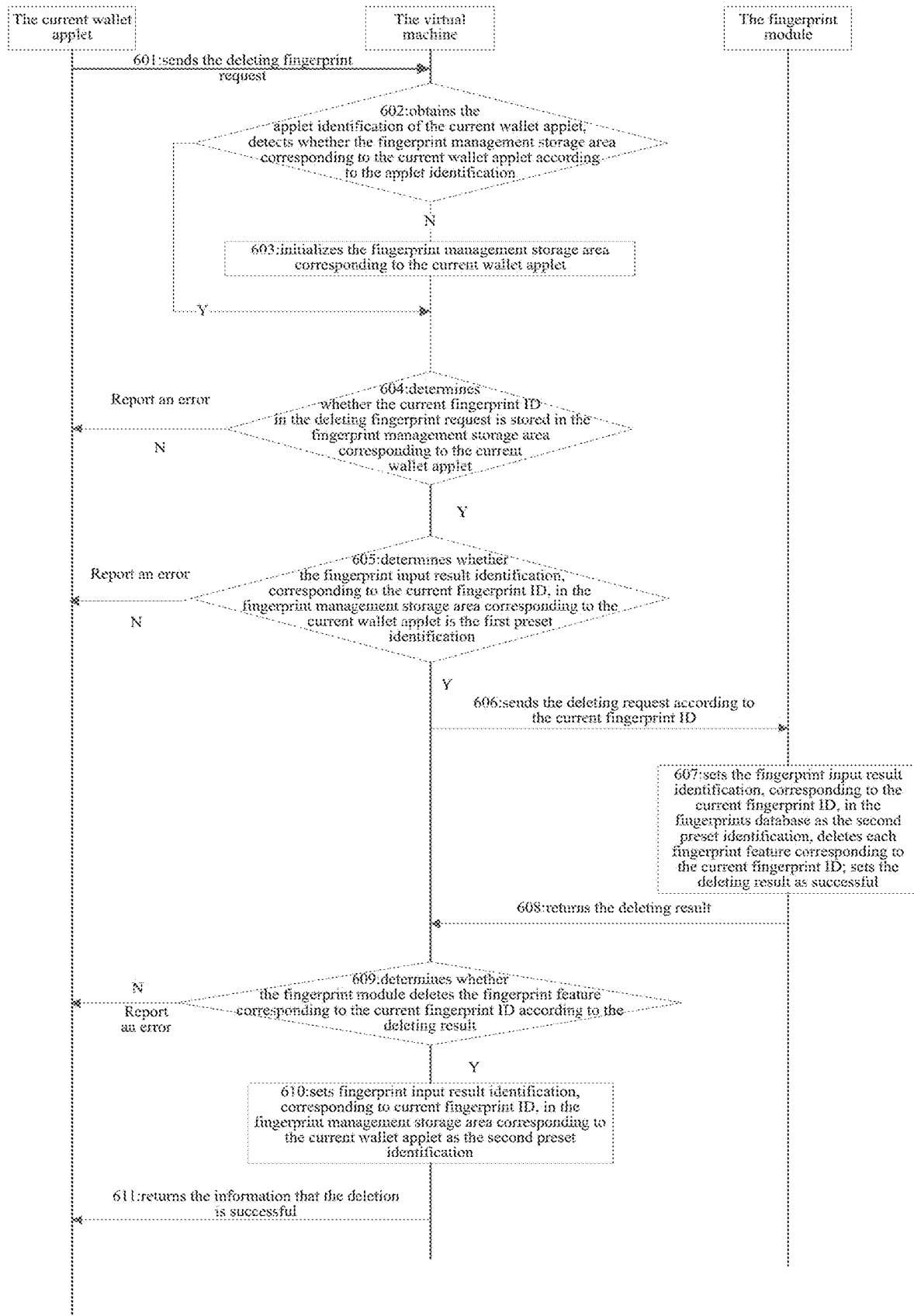

The fingerprint deleting process, as shown in FIG. 8, includes:

Step 601, the current wallet applet sends the deleting fingerprint request to the virtual machine;

Step 602, the virtual machine obtains the applet identification of the current wallet applet, and detects whether the fingerprint management storage area corresponding to the current wallet applet is initialized according to the applet identification, if yes, goes to Step 604; otherwise goes to Step 603;

Step 603, the virtual machine initializes the fingerprint management storage area corresponding to the current wallet applet;

Step 604, the virtual machine determines whether the current fingerprint ID in the deleting fingerprint request is stored in the fingerprint management storage area corresponding to the current wallet applet, if yes, goes to Step 605; otherwise, reports an error to the current wallet;

Step 605, the virtual machine determines whether the fingerprint input result identification, which corresponds to the current fingerprint ID, in the fingerprint management storage area corresponding to the current wallet applet is the first preset identification, if yes, goes to Step 606; otherwise, reports an error to the current wallet applet;

Step 606, the virtual machine sends the deleting request to the fingerprint module according to the current fingerprint ID;

Step 607, the fingerprint module sets the fingerprint input result identification, which corresponds to the current fingerprint ID, in the fingerprint database as the second preset identification, deletes each fingerprint feature corresponding to the current fingerprint ID; and sets the deleting result as that the deletion is successful;

Step 608, the fingerprint module returns the deleting result to the virtual machine;

Step 609, the virtual machine determines whether the fingerprint module deletes the fingerprint feature corresponding to the current fingerprint ID, if yes, goes to Step 610; otherwise, reports an error to the current wallet;

Step 610, the virtual machine sets the fingerprint input result identification, which corresponds to the current fingerprint ID, in the fingerprint management storage area corresponding to the current wallet applet as the second preset identification;

Step 611, the virtual machine returns the deleting successful information to the current wallet applet.

Embodiment 2 provides a method for verifying an identity of a holder of a hardware wallet and a hardware wallet, the hardware wallet includes virtual machine, biometrics verification module and a multiple of wallet applets, each of which stores one private key, the hardware wallet inputs for each wallet applet via the virtual machine and the biometrics verification module the biometric feature of the hardware wallet holder corresponding to each wallet applet for verifying the identity, only if the identity verification of the hardware wallet holder corresponding to the current wallet applet is passed, the digital cash can be traded using the private key in the current wallet applet, so as to improve the security protection mechanism of the digital cash and realize the identity verification management of the multiple wallet applets.

Embodiment 3

It provides a hardware wallet according to Embodiment 3, as shown in FIG. 9, including: a virtual machine, a biometrics verification module and a multiple of wallet applets;

the current wallet applet in the multiple of wallet applets includes a first receiving sub-module 01, a first sending sub-module 02, a second receiving sub-module 03, a first determining sub-module 04, a first generating sub-module 05 and a second sending sub-module 06;

the virtual machine includes a third receiving sub-module 07, a third sending sub-module 08, a fourth receiving sub-module 09, a second determining sub-module 10, a third determining sub-module 11 and a fourth sending sub-module 12;

the biometrics verification module includes a fifth receiving sub-module 13, a first prompting sub-module 14, a first detecting sub-module 15, a fourth determining sub-module 16 and a fifth sending sub-module 17;

the first receiving sub-module 01 is configured to receive the transaction request including the transaction data from the upper computer; the transaction data includes a key derive path;

the first sending sub-module 02 is configured to send the first verification request to the virtual machine;

the second receiving sub-module 03 is configured to receive the first verifying result from the virtual machine;

the first determining sub-module 04 is configured to determine the first verifying result received by the second receiving sub-module 03 is that the verification is successful;

the first generating sub-module 05 is configured to sign on the transaction data and the account address corresponding to the key derive path by using the private key corresponding to the key derive path received by the first receiving sub-module 01 to generate the transaction voucher when the first determining sub-module 04 determines that the first verifying result is that the verification is successful;

the second sending sub-module 06 is configured to return the transaction voucher generated by the first generating sub-module 05 to the upper computer; or reports an error to the upper computer when the first determining module 04 determines that the first verifying result is not the verification is successful;

the third receiving sub-module 07 is configured to receive the first verification request from the current wallet applet;

the third sending sub-module 08 is configured to send the second verification request to the biometrics verification module;

the fourth receiving sub-module 09 is configured to receive the second verifying result from the biometrics verification module;

the second determining sub-module 10 is configured to determine whether the second verifying result received by the fourth receiving sub-module 09 is that the verification is failure;

the third determining sub-module 11 is configured to determine whether the current user matches with the current wallet applet according to the biometric ID when the second determining sub-module 10 determines that the second verifying result is not the verification is failure;

the third determining sub-module 11 is specifically configured to determine whether the biometrics feature input result identification, which corresponds to the biometric ID, in the biometrics register result list corresponding to the current wallet applet is the first preset identification when the second determining sub-module 10 determines that the second verifying result is not that the verification is failure, if yes, the current user matches with the current wallet applet; otherwise, the current user does not match with the current wallet applet, the fourth sending sub-module 12 is configured to make that the verification is failure as the first verifying result and send the result to the current wallet applet when the second determining sub-module 10 determines the result is yes; to make that the verification is successful as the first verifying result and send the result to the current wallet applet when the third determining sub-module 11 determines the result is yes;

the fifth receiving sub-module 13 is configured to receive the second verification request from the virtual machine;

the first prompting sub-module 14 is configured to prompt the user to input a biological feature after the fifth receiving sub-module 13 receives the second verification request from the virtual machine;

the first detecting sub-module 15 is configured to detect whether the user inputs the biological feature;

the fourth determining sub-module 16 is configured to determine whether the current user is registered according to the biological feature detected by the first detecting sub-module 15;

the fourth determining sub-module 16 is specifically configured to look up the biological feature detected by the first detecting sub-module 15 from the biometrics database of the biometrics verification module, if the biological feature is found, the current user is registered; otherwise, the current user is not registered, the fifth sending sub-module 17 is configured to make the biometric ID corresponding to the biological feature as the second verifying result and send the result to the virtual machine when the fourth determining sub-module 16 determines the result is yes; make that the verification is failure as the second verifying result and send to the virtual machine when the fourth determining sub-module 16 determines the result is no.

In Embodiment 3, preferably, the first preset identification is 1, the second preset identification is 0.

In Embodiment 3, the virtual machine can further include: a sixth receiving sub-module, an activating sub-module and a sixth sending sub-module;

The sixth receiving sub-module is configured to receive the activating request including the activating wallet applet instruction and the applet identification from the upper computer;

The activating sub-module is configured to activate the wallet applet corresponding to the applet identification received by the sixth receiving sub-module, and make the wallet applet corresponding to the applet identification as the current wallet applet;

The sixth sending sub-module is configured to return the activating successful response to the upper computer.

In Embodiment 3, the second verification request can further include the biometrics register result list corresponding to the current wallet applet; correspondingly, the fourth determining sub-module 16 can be further configured to determines whether the current user is registered and matches with the current wallet applet according to the biological feature detected by the first detecting sub-module 15, the biometrics database of the biometrics verification module and the biometrics register result list.

Furthermore, the virtual machine can include a first obtaining sub-module;

The first obtaining sub-module is configured to obtain the biometrics register result list corresponding to the current wallet applet after the third receiving sub-module 07 receives the first verification request from the current wallet applet, and before the third sending sub-module 08 sends the second verification request to the biometrics verification module.

Furthermore, the first verification request can also include the biometrics register result list corresponding to the current wallet applet; correspondingly.

the virtual machine further includes a seventh receiving sub-module and a seventh sending sub-module;

the seventh receiving sub-module is configured to receive the querying biometrics register result list request from the current wallet applet;

the seventh sending sub-module is configured to return the biometrics register result list corresponding to the current wallet applet to the current wallet applet.

In Embodiment 3, when the fourth determining sub-module 16 is specifically configured to determine whether the current user is registered and matches with the current wallet applet according to the biological feature detected by the first detecting sub-module 15, the biometrics database and the biometrics register result list, the fourth determining sub-module 16 specifically includes a first looking up unit and a first determining unit;

the first looking up unit is configured to look up the biometric ID, which corresponds to the biological feature and whose biometrics input result identification in the biometrics register result list is the first preset identification according to the biological feature detected by the first detecting sub-module 15, the biometrics database of the biometrics verification module and the biometrics register result list;

the first determining unit is configured to determine the current user is registered and matches with the current wallet applet when the first looking up unit found the biometric ID, which corresponds to the biological feature and whose biometrics input result identification is the first preset identification; to determine the current user is not registered and/or does not match with the current wallet applet when the first looking up unit does not find the biometric ID, which corresponds to the biological feature and whose biometrics input result identification is the first preset identification.

In the hardware wallet in Embodiment 3, the virtual machine can further include an eighth receiving sub-module, an eighth sending sub-module, a ninth receiving sub-module, a fifth determining sub-module, a first setting sub-module and a ninth sending sub-module; the biometrics verification sub-module further includes a tenth receiving module, a first corresponding sub-module, a first storing sub-module, a second setting sub-module and a tenth sending sub-module;

the eighth receiving sub-module is configured to receive the registration request from the current wallet applet;

the eighth sending sub-module is configured to send the inputting request to the biometrics verification module;

the ninth receiving sub-module is configured to receive the inputting result from the biometrics verification module;

the fifth determining sub-module is configured to determine whether the biometrics verification module obtains the biological feature corresponding to the current biometric ID successfully according to the inputting result received by the ninth receiving sub-module;

the first setting sub-module is configured to set the biometrics input result identification, which corresponds to the current biometric ID, in the biometrics register result list corresponding to the current wallet applet as the first preset identification when the fifth determining sub-module determines the result is yes;

the ninth sending sub-module is configured to report an error to the current wallet applet when the fifth determining sub-module determines the result is no; and to return that the registration is successful to the current wallet applet after the first setting sub-module sets the biometrics inputting result identification, which corresponds to the current biometric ID, in the biometrics register result list corresponding to the current wallet as the first preset identification;

the tenth receiving sub-module is configured to receive the inputting request from the virtual machine;

the first prompting sub-module 14 is further configured to prompt the current user to input the biological feature when the tenth receiving sub-module receives the inputting request from the virtual machine;

the first corresponding sub-module is configured to build the corresponding relation between the biological feature detected by the first detecting sub-module 15 and the current biometric ID;

the first storing sub-module is configured to set the biometrics input result identification, which corresponds to the current biometric ID, in the biometrics database as the first preset identification, and store the current biometric ID and the biological feature corresponding to the current biometric ID into the biometrics database;

the second setting sub-module is configured to set the inputting result as successful when the first corresponding sub-module builds the corresponding relation between the current biometric ID and the biological feature corresponding to the current biometric ID; and set the inputting result as failure when the first detecting sub-module 15 does not detect the biological feature input by the user;

the tenth sending sub-module is configured to send the inputting result to the virtual machine.

Furthermore, the registration request can also include the current biometric ID; the inputting request can include the current biometric ID.

Furthermore, the virtual machine can further include an eleventh receiving sub-module, an eleventh sending sub-module, a twelfth receiving sub-module and the twelfth sending sub-module;

the eleventh receiving sub-module is configured to receive the obtaining current biometric ID request from the current wallet applet before the eighth receiving sub-module receives the registration request from the current wallet applet;

the eleventh sending sub-module is configured to send the obtaining current biometric ID request to the biometrics verification module;

the twelfth receiving sub-module is configured to receive the current biometric ID from the biometrics verification module;

the twelfth sending sub-module is configured to return the current biometric ID to the current wallet applet;

the biometrics verification sub-module further includes a thirteenth receiving sub-module, a second obtaining sub-module and a thirteenth sending sub-module;

the thirteenth receiving sub-module is configured to receive the obtaining current biometric ID request from the virtual machine;

the second obtaining sub-module is configured to obtain the current biometric ID from the biometrics database;

the second obtaining sub-module is specifically configured to obtain the smallest biometric ID whose registration result identification is the second preset identification from the biometrics database, and make the smallest biometric ID as the current biometric ID.

The thirteenth receiving sub-module is configured to return the current biometric ID obtained by the second obtaining sub-module to the virtual machine.

In the present Embodiment, the inputting request includes the current biometric ID; correspondingly, the virtual machine can further include: a third obtaining sub-module;

the third obtaining sub-module is configured to obtain the current biometric ID from the biometrics register result list corresponding to the current wallet applet after the eighth receiving sub-module receives the registration request from the current wallet applet.

Furthermore, the third obtaining sub-module is specifically configured to obtain the smallest biometric ID whose register result identification is the second preset identification from the biometrics register result list corresponding to the current wallet applet and make the smallest biometric ID as the current biometric ID after the eighth receiving sub-module receives the registering request from the current wallet applet.

In Embodiment 3, if the second setting sub-module sets the inputting result as successful, the inputting result further includes: the current biometric ID; correspondingly, the first corresponding sub-module is specifically configured to build the corresponding relation between the biological feature detected by the first detecting sub-module and the current biometric ID in the biometrics database.

Furthermore, the biometrics verification sub-module can further include a fourth obtaining sub-module;

The fourth obtaining sub-module is configured to obtain the smallest biometric ID whose register result identification is the second preset identification from the biometrics database, and make the smallest biometric ID as the current biometric ID before the first corresponding sub-module builds the corresponding relation between the biological feature and the current biometric ID.

In Embodiment 3, when the registration request includes the current biometric ID; the inputting request includes the current biometric ID, the virtual machine further includes: a second detecting sub-module, a fourteenth sending sub-module, a fourteenth receiving sub-module and a sixth determining sub-module; the biometrics verification module can further include: a fifteenth receiving sub-module, a seventh determining sub-module, a third setting sub-module and a fifteenth sending sub-module;

The second detecting sub-module is configured to detect whether the biometrics input result identification, which corresponds to the current biometric ID, in the biometrics register result list corresponding to the current wallet applet is the first preset identification after the eighth receiving sub-module receives the registration request from the current wallet applet, and before the eighth sending sub-module sends the inputting request to the biometrics verification module;

the fourteenth sending sub-module is configured to send the first looking up request including the biometric ID to the biometrics verification module after the second detecting sub-module detects the result is yes;

the fourteenth receiving sub-module is configured to receive the first looking up result from the biometrics verification module;

the sixth determining sub-module is configured to determine whether the biometrics input result, which corresponds to the current biometric ID in the biometrics database of the biometrics verification module according to the first looking up result received by the fourteenth receiving sub-module is the first preset identification;

the eighth sending sub-module is configured to send the inputting request after the second detecting sub-module detects the result is yes; and send the inputting request to the biometrics verification module when the sixth determining sub-module determines the result is no;

the ninth sending sub-module is configured to report an error when the sixth determining sub-module determines the result is yes;

the fifteenth receiving sub-module is configured to receive the first looking up request from the virtual machine;

the seventh determining sub-module is configured to determine whether the biometrics input result identification, which corresponds to the current biometric ID, in the biometrics database is the first preset identification after the fifteenth receiving sub-module receives the first looking up request from the virtual machine;

the third setting sub-module is configured to set the first looking up result as failure when the seventh determining sub-module determines the result is yes; and to set the first looking up result as successful when the seventh determining sub-module determines the result is no;

the fifteenth sending sub-module is configured to send the first looking up result set by the first setting sub-module to the virtual machine.

In Embodiment 3, the registration request can further include the number of times of input; the inputting request can further include the number of times of input; correspondingly, the virtual machine can further include an eighth determining sub-module; the biometrics verification sub-module can further include a ninth determining sub-module;

the eighth determining sub-module is configured to determine whether the number of times of input is the preset limited number of times after the fifth determining sub-module determines the result is yes, and before the first setting sub-module sets the biometrics input result identification, which corresponds to the current biometric ID, in the biometrics register result list corresponding to the current wallet applet as the first preset identification;

the first setting sub-module is specifically configured to set the biometrics input result identification, which corresponds to the current biometric ID, in the biometrics register result list corresponding to the current wallet applet as the first preset identification when the eighth determining sub-module determines the result is yes;

the ninth sending sub-module is configured to return the registration is successful to the current wallet applet when the eighth determining sub-module determines the result is no;

the ninth determining sub-module is configured to determine the number of times of input is the preset limited number of times after the first corresponding sub-module builds the corresponding relation between the biological feature detected by the first detecting sub-module 15 and the current biometric ID;

the first storing sub-module is specifically configured to set the biometrics input result identification, which corresponds to the current biometric ID, in the biometrics database as the first preset identification, and store the current biometric ID and the biological feature corresponding to the current biometric ID into the biometrics database after the ninth determining sub-module determines the result is yes;

the second setting sub-module is configured to set the inputting result as success after the ninth determining sub-module determines the result is no.

In the hardware wallet in Embodiment 3, the virtual machine can further include a sixteenth receiving sub-module, a fifth obtaining sub-module, a tenth determining sub-module, a sixteenth sending sub-module, an eleventh determining sub-module, a seventeenth sending sub-module, a seventeenth receiving sub-module, a twelfth determining sub-module and a fourth setting sub-module; the biometrics verification module can further include an eighteenth receiving sub-module, a first looking up module, a fifth setting sub-module, a first deleting sub-module and an eighteenth sending sub-module;

the sixteenth receiving sub-module is configured to receive the clearing up request from the current wallet applet;

the fifth obtaining sub-module is configured to make the first biometric ID in the biometrics register result list as the current biometric ID after the sixteenth receiving sub-module receives the clearing up request from the current wallet applet; to make the next biometric ID of the current biometric ID in the biometrics register result list corresponding to the current wallet applet as the current biometric ID when the eleventh determining sub-module determines the result is no; to make the next biometric ID of the current biometric ID in the biometrics register result list corresponding to the current wallet applet as the current biometric ID after the fourth setting sub-module sets the biometrics input result identification, which corresponds to the current biometric ID, in the biometrics register result list current wallet applet as the second preset identification;

the tenth determining sub-module is configured to determine whether the current biometric ID obtained by the fifth obtaining sub-module is beyond the preset limited scope;

the sixteenth sending sub-module is configured to return the information that clearing up is successful to the current wallet applet after the tenth determining sub-module determines the result is yes; and reports an error to the current wallet applet after the twelfth determining sub-module determines the result is no;

the eleventh determining sub-module is configured to determine whether the biometrics input result identification, which corresponds to the current biometric ID, in the biometrics register result list corresponding to the current wallet applet is the first preset identification after the tenth determining sub-module determines the result is no;

the seventeenth sending sub-module is configured to send the deleting request including the current biometric ID to the biometrics verification module after the eleventh determining sub-module determines the result is yes;

the seventeenth receiving sub-module is configured to receive the deleting result from the biometrics verification module;

the twelfth determining sub-module is configured to determine whether the biometrics verification module deletes the biological feature corresponding to the current biometric ID according to the deleting result received by the seventh receiving sub-module;

the fourth setting sub-module is configured to set the biometrics input result identification, which corresponding to the current biometric ID, in the biometrics register result list corresponding to the current wallet applet as the second preset identification after the twelfth determining sub-module determines the result is yes;

the eighteenth receiving sub-module is configured to receive the deleting request including the current biometric ID from the virtual machine;

the first looking up module is configured to looks up the current biometric ID received by the eighteenth receiving sub-module from the biometrics database;

the fifth setting sub-module is configured to set the biometrics input result identification, which corresponds to the current biometric ID, in the biometrics database as the second preset identification when the first looking up sub-module finds the current biometric ID received by the eighteenth sending sub-module from the biometrics database; to set the deleting result as that the deletion is successful after the first deleting sub-module deletes the biological feature corresponding to the current biometric ID; to set the deleting result as that the deletion is failure when the first looking up sub-module does no find the current biometric ID received by the eighteenth sending sub-module from the biometrics database;

the first deleting sub-module is configured to delete the biological feature corresponding to the current biometric ID after the first looking up sub-module finds the current biometric ID received by the eighteenth sending sub-module from the biometrics database;

the eighteenth sending sub-module is configured to return the deleting result set by the fifth setting sub-module to the virtual machine.

In the hardware wallet in Embodiment 3, the virtual machine can further include a nineteenth receiving sub-module, a thirteenth determining sub-module, a nineteenth sending sub-module, a twentieth sending sub-module, a twentieth receiving sub-module, a fourteenth determining sub-module and a sixth setting sub-module; the biometrics verification module can further include an eighteenth receiving sub-module, the first looking up sub-module, the fifth setting sub-module, a first deleting sub-module and an eighteenth sending sub-module;

the nineteenth receiving sub-module is configured to receive the deleting request including the current biometric ID from the current wallet applet;

the thirteenth determining sub-module is configured to determine whether the biometrics input result identification, which corresponds to the current biometric ID, in the biometrics register result list corresponding to the current wallet applet is the first preset identification;

the nineteenth sending sub-module is configured to report an error to the current wallet after the thirteenth determining sub-module determines the result is no; to return the information that the deletion is successful to the current wallet applet after the sixth setting sub-module sets the biometrics input result identification, which corresponds to the current biometric ID, in the biometrics register result list corresponding to the current wallet applet as the second preset identification; to report an error to the current wallet after the fourteenth determining sub-module determines the result is no;

the twentieth sending sub-module is configured to send the deleting request including the current biometric ID to the biometrics verification module, after the thirteenth determining sub-module determines the result is no;

the twentieth receiving sub-module is configured to receive the deleting result from the biometrics verification module;

the fourteenth determining sub-module is configured to determine whether the biometrics verification module deletes the biological feature corresponding to the current biometric ID according to the deleting result received by the twentieth receiving sub-module;

the sixth setting sub-module is configured to set the biometrics input result identification, which corresponds to the current biometric ID, in the biometrics register result list corresponding to the current wallet as the second preset identification when the fourteenth determining sub-module determines the result is yes;

the eighteenth receiving sub-module is configured to receive the deleting request including the current biometric ID from the virtual machine;

the first looking up sub-module is configured to look up the current biometric ID received by the eighteenth receiving sub-module from the biometrics database;

the fifth setting sub-module is configured to set the biometrics input result identification, which corresponds to the current biometric ID, in the biometrics database as the second preset identification when the first looking up sub-module finds the current biometric ID received by the eighteenth sending sub-module from the biometrics database; to set the deleting result as the deletion is successful when the first deleting sub-module deletes the biological feature corresponding to the current biometric ID; to set the deleting result as the deletion is failure when the first looking up sub-module does not find the current biometric ID received by the eighteenth sending sub-module;

the first deleting sub-module is configured to delete the biological feature corresponding to the current biometric ID when the first looking up sub-module finds the current biometric ID received by the eighteenth sending sub-module from the biometrics database;

the eighteenth sending sub-module is configured to return the deleting result set by the fifth setting sub-module to the virtual machine.

Furthermore, the virtual machine further includes a second looking up sub-module;

the second looking up sub-module is configured to look up the current biometric ID from the biometrics register result list corresponding to the current wallet applet after the nineteenth receiving sub-module receives the deleting request including the current biometric ID from the current wallet applet, and before the thirteenth determining sub-module determines whether the biometrics input result identification, which corresponds to the current biometric ID, in the biometrics register result list corresponding to the current wallet applet is the first preset identification;

the thirteenth determining sub-module is specifically configured to determine whether the biometrics input result identification, which corresponds to the current biometric ID, in the biometrics register result list corresponding to the current wallet applet is the first preset identification when the second looking up module finds the current biometric ID from the biometrics register result list corresponding to the current wallet applet;

the nineteenth sending sub-module is further configured to report an error to the current wallet applet when the second looking up sub-module does not find the current biometric ID from the biometrics register result list corresponding to the current wallet applet.

In the hardware wallet in Embodiment 3, the current wallet applet can further include a second generating sub-module;

the second generating sub-module is configured to generate the private key and the public key, which correspond to the key derive path, according to the master key via the key derive algorithm, and to generate the account address according to the public key before the first generating sub-module 05 generates the transaction voucher.

It provides a hardware wallet in Embodiment 3, which include the virtual machine, the biometrics verification module and a multiple of wallet applets, each of the wallet applet stores the private key, the hardware wallet inputs the biological feature, which corresponds to the identity of the holder of the hardware wallet and which is configured for verification, for each wallet applet, thus, the user can just use the private key to transact the digital cash in the current wallet applet in the case that the identity of the holder of the hardware wallet of the current wallet applet is verified successfully, in this way, it can improve the safety mechanism of the digital cash on one hand, realize the identity verification management of a multiple of wallet applets on the other hand.

The above are only preferred embodiments of the present invention while the protection scope of the present invention is not limited thereto. Any modifications, changes or replacements that can be easily thought of by those skilled in the art within the technical scope disclosed by the present invention should be covered within the scope of the present invention. Therefore, the protection scope of the present invention should be subject to the appended claims.

The invention claimed is:

1. A method for verifying an identity of a holder of a hardware wallet, wherein the hardware wallet comprises: a virtual machine, a biometrics verification module and a multiple of wallet applets; the method for verifying the identity of the holder of the hardware wallet comprises the following steps:

Step r1, sending, by a current wallet applet, a first verification request to the virtual machine if the current wallet applet receives a transaction request including the transaction data from the upper computer; the transaction data comprising a key derive path;

Step r2, sending, by the virtual machine, a second verification request to the biometrics verification module when the virtual machine receives the first verification request from the current wallet applet;

Step r3, prompting, by the current biometrics verification module, a current user to input a biological feature, and determining whether the current user is registered according to the biological feature when the biological feature input by the user is detected, if yes, making a biometric ID corresponding to the biological feature as a second verification result and sending the second verification result to the virtual machine, the virtual machine executing Step r4; otherwise, making that the verification is failure as the second verification result and sending the second verification result to the virtual machine, and the virtual machine executing Step r4;

Step r4, determining, by the virtual machine, whether the second verification result is that the verification is failure, if yes, making the verification is failure as the first verification result and sending the first verification result to the current wallet, and the current wallet executing Step r6; otherwise, executing Step r5;

Step r5, determining, by the virtual machine, whether the current user matches with the current wallet applet according to the biometric ID, if yes, making that the verification is successful as the first verification result and sending the first verification result to the current wallet applet, and the current wallet applet executing Step r6; otherwise, making the verification is failure as the first verification result and sending the first verification to the current wallet applet, and the current wallet applet executing Step r6; and Step r6, determining, by the current wallet applet, whether the first verification result is that the verification is successful, if yes, signing on the transaction data and an account address corresponding to the key derive path by using a private key corresponding to the key derive path to generate a transaction voucher, and returning the transaction voucher to the upper computer, and ending the current operation; otherwise, reporting an error to the upper computer, and ending the current operation.

2. The method as claimed in claim 1, wherein the second verification request comprises a biometrics register result list corresponding to the current wallet applet;

Step r3 specifically comprises: prompting, by the biometrics verification module, the user to input the biological feature, and determining whether the current user is registered and the current user matches with the current wallet applet according to the biological feature, a biometrics database of the biometrics verification module and the biometrics register result list in the case that the biological feature input by the user is detected, if yes, making a biometric ID, which corresponds to the biological feature, in the biometrics register result list as the second verification result and sending the second verification result to the virtual machine, and the virtual machine executing Step r4; if the biological feature input by the user is not found, making that the verification is failure as the second verification result and sending the second verification result to the virtual machine, and the virtual machine executing Step r4.

3. The method as claimed in claim 2, wherein between Step r1 and Step r2, said method further comprises: obtaining, by the virtual machine, the biometrics register result list corresponding to the current wallet applet.

4. The method as claimed in claim 2, wherein the first verification request comprises: the biometrics register result list corresponding to the current wallet applet;

before Step r1, the method further comprises:

Step c1, receiving, by the virtual machine, a querying biometrics register result list request from the current wallet applet; and Step c2, returning, by the virtual machine, the biometrics register result list corresponding to the current wallet applet to the current wallet applet.

5. The method as claimed in claim 1, wherein said method further comprises:

Step s1, sending, by the virtual machine, an inputting request to the biometrics verification module when the virtual machine receives a registering request from the current wallet applet;

Step s2, prompting, by the biometrics verification module, the user to input the biological feature, building a corresponding relation between the biological feature and the current biometric ID after the biological feature input by the user is detected, setting a biometrics input result identification, which corresponds to the current biometric ID, in a biometrics database of the biometrics verification module as a first preset identification, storing the current biometric ID and the biological feature corresponding to the current biometric ID into the biometrics database, setting the inputting result as that the inputting is successful, and sending the inputting result to the virtual machine; if no biological feature input by the user is detected, setting the inputting result as that the inputting is failure, and sending the inputting result to the virtual machine;

Step s3, determining, by the virtual machine, whether the biometrics verification module obtains the biological feature corresponding to the current biometric ID successfully according to the inputting result, if yes, executing Step s4; otherwise, reporting an error to the current wallet applet, and ending the current operation; and Step s4, setting, by the virtual machine, the biometrics input result identification, which corresponds to the current biometric ID, in the biometrics register result list corresponding to the current wallet applet as the first preset identification, and returning that the registration is successful to the current wallet applet, and ending the current operation.

6. The method as claimed in claim 5, wherein the registration request comprises the current biometric ID; the inputting request comprises the current biometric ID;

before Step s1, the method further comprises: the virtual machine receiving an obtaining current biometric ID request from the current wallet applet, and sending the obtaining current biometric ID request to the biometrics verification module; the biometrics verification module obtaining the current biometric ID from the biometrics database of the biometrics verification module, and returning the current biometric ID to the virtual machine; the virtual machine returning the current biometric ID to the current wallet applet.

7. The method as claimed in claim 5, wherein the inputting request comprises the current biometric ID;

after the virtual machine receives the registration request from the current wallet applet, the method further comprises: the virtual machine obtaining the current biometric ID from the biometrics registration result list corresponding to the current wallet applet.

8. The method as claimed in claim 5, wherein in the case that the inputting result is that the inputting is successful, the inputting result further comprises the current biometric ID;

building the corresponding relation between the biological feature and the current biometric ID, specifically building the corresponding relation between the biological feature and the current biometric ID in the biometrics database of the biometrics verification module.

9. The method as claimed in claim 5, wherein the registration request comprises the current biometric ID; the inputting request comprises the current biometric ID;

after the virtual machine receives the registration request from the current wallet applet, before the virtual machine sends the inputting request to the biometrics verification module, the method further comprises:

Step a1, the virtual machine detecting whether the biometrics input result identification, which corresponds to the current biometric ID, in the biometrics register result list corresponding to the current wallet applet is the first preset identification, if yes, continuing the process; otherwise, executing Step a2;

Step a2, the virtual machine sending a first looking up request which includes the biometric ID to the biometrics verification module;

Step a3, the biometrics verification module determining whether the biometrics input result identification, which corresponds to the current biometric ID, in the biometrics database of the biometrics verification module is the first preset identification after the receiving a first looking up request from the virtual machine, if yes, setting a first looking up result as failure, and sending the first looking up result to the virtual machine; otherwise, setting the first looking up result as success, and sending the first looking up result to the virtual machine; and Step a4, the virtual machine determining whether the biometrics input result, which corresponds to the current biometric ID, in the biometric database of the biometrics verification module is the first preset identification according to the first looking up result, if yes, reporting an error to the current wallet applet, and ending the current operation; otherwise, continuing the process.

10. The method as claimed in claim 1, wherein, before using the private key corresponding to the key derive path to sign on the transaction data and the account address corresponding to the key derive path in order to generate the transaction voucher, the method further includes: the current wallet applet generates a public key and a private key, which correspond to the key derive path, via a key derive algorithm according to a master key of the current wallet applet, and generates the account address according to the public key.

11. A hardware wallet, wherein said hardware wallet comprises: a virtual machine, a biometrics verification module and a multiple of wallet applets;

a current wallet applet of the multiple of wallet applets comprises a first receiving sub-module, a first sending sub-module, a second receiving sub-module, a first determining sub-module, a first generating sub-module and a second sending sub-module;

the first receiving sub-module is configured to receive a transaction request including the transaction data from an upper computer; the transaction data comprising a key derive path;

the first sending sub-module is configured to send a first verification request to the virtual machine;

the second receiving sub-module is configured to receive a first verification result from the virtual machine;

the first determining sub-module is configured to determine whether the first verification result received by the second receiving sub-module is that the verification is successful;

the first generating sub-module is configured to sign on the transaction data and the account address corresponding to the key derive path by using the private key corresponding to the key derive path received by the first receiving sub-module to generate the a transaction voucher after the first determining sub-module determines that the first verification result is that the verification is successful; and the second sending sub-module is configured to return the transaction voucher generated by the first generating sub-module to the upper computer; and reports an error to the upper computer after the first determining sub-module determines that the first verification result is not that the verification is successful;

the virtual machine comprises: a third receiving module, a third sending sub-module, a fourth receiving sub-module, a second determining sub-module, a third determining sub-module and a fourth sending sub-module;

the third receiving sub-module is configured to receive the first verification request from the current wallet applet;

the third sending sub-module is configured to send the second verification request to the biometrics verification module;

the fourth receiving sub-module is configured to receive the second verification result from the biometrics verification module;

the second determining sub-module is configured to determine whether the second verification result received by the fourth receiving sub-module is that the verification is failure;

the third determining sub-module is configured to determine whether the current user matches with the current wallet applet according to the biometric ID when the second determining sub-module determines that the second verification result is not the verification is failure; and the fourth sending sub-module is configured to make that the verification is failure as the first verification result and send the first verification result to the current wallet when the second determining sub-module determines that the verification result is failure; to make that the verification is failure as the first verification result and send the result to the current wallet applet when the third determining sub-module determines that the current user does not match with the current wallet applet; to make that the verification is successful as the first verification result and send the result to the current wallet applet when the third determining sub-module determines that the current user matches with the current wallet applet; and the biometrics verification module comprises a fifth receiving sub-module, a first prompting sub-module, a first detecting sub-module, a fourth determining sub-module and a fifth sending sub-module;

the fifth receiving sub-module is configured to receive the second verification request from the virtual machine;

the first prompting sub-module is configured to prompt the current user to input a biological feature after the fifth receiving sub-module receives the second verification request from the virtual machine;

the first detecting sub-module is configured to detect whether the user inputs a biological feature;

the fourth determining sub-module is configured to determine whether the current user is registered according to the biological feature detected by the first detecting sub-module; and the fifth sending sub-module is configured to make the biometric ID corresponding to the biological feature as the second verification result and send the result to the virtual machine when the fourth determining sub-module determines that the user is registered; to make that the verification is failure as the second verification result and send the result to the virtual machine when the fourth determining sub-module determines that the current user is not registered.

12. The hardware wallet as claimed in claim 11, wherein the second verification request can comprise the biometrics register result list corresponding to the current wallet applet;

the fourth determining sub-module is specifically configured to determines whether the current user is registered and matches with the current wallet applet according to the biological feature detected by the first detecting sub-module, the biometrics database of the biometrics verification module and the biometrics register result list.

13. The hardware wallet as claimed in claim 12, wherein the virtual machine further comprises a first obtaining sub-module;

the first obtaining sub-module is configured to obtain the biometrics register result list corresponding to the current wallet applet after the third receiving sub-module receives the first verification request from the current wallet applet, and before the third sending sub-module sends the second verification request to the biometrics verification module.

14. The hardware wallet as claimed in claim 12, wherein the first verification request comprises the biometrics register result list corresponding to the current wallet applet;

the virtual machine further comprises a seventh receiving sub-module and a seventh sending sub-module;

the seventh receiving sub-module is configured to receive a querying biometrics register result list request from the current wallet applet; and the seventh sending sub-module is configured to return the biometrics register result list corresponding to the current wallet applet to the current wallet applet.

15. The hardware wallet as claimed in claim 11, wherein the virtual machine further comprises an eighth receiving sub-module, an eighth sending sub-module, a ninth receiving sub-module, a fifth determining sub-module, a first setting sub-module and a ninth sending sub-module;

the eighth receiving sub-module is configured to receive the registration request from the current wallet applet;

the eighth sending sub-module is configured to send the inputting request to the biometrics verification module;

the ninth receiving sub-module is configured to receive the inputting result from the biometrics verification module;

the fifth determining sub-module is configured to determine whether the biometrics verification module obtains the biological feature corresponding to the current biometric ID successfully according to the inputting result received by the ninth receiving sub-module;

the first setting sub-module is configured to set the biometrics input result identification, which corresponds to the current biometric ID, in the biometrics register result list corresponding to the current wallet applet as the first preset identification when the fifth determining sub-module determines that the biometrics verification module obtains the biological feature corresponding to the current biometric ID successfully; and the ninth sending sub-module is configured to report an error to the current wallet applet when the fifth determining sub-module determines the biometrics verification module does not obtain the biological feature successfully; and to return that the registration is successful to the current wallet applet after the first setting sub-module sets the biometrics inputting result identification, which corresponds to the current biometric ID, in the biometrics register result list corresponding to the current wallet as the first preset identification; and the biometrics verification module further comprises a tenth receiving sub-module, a first corresponding sub-module, a first storing sub-module, a second setting sub-module and a tenth sending sub-module;

the tenth receiving sub-module is configured to receive the inputting request from the virtual machine;

the first prompting sub-module is further configured to prompt the current user to input the biological feature when the tenth receiving sub-module receives the inputting request from the virtual machine;

the first corresponding sub-module is configured to build the corresponding relation between the biological feature detected by the first detecting sub-module and the current biometric ID;

the first storing sub-module is configured to set the biometrics input result identification, which corresponds to the current biometric ID, in the biometrics database as the first preset identification, and store the current biometric ID and the biological feature corresponding to the current biometric ID into the biometrics database;

the second setting sub-module is configured to set the inputting result as successful when the first corresponding sub-module stores the current biometric ID and the biological feature corresponding to the current biometric ID into the biometrics database; and set the inputting result as failure when the first detecting sub-module does not detect the biological feature input by the user; and the tenth sending sub-module is configured to send the inputting result to the virtual machine.

16. The hardware wallet as claimed in claim 15, wherein the registration request comprises the current biometric ID; the inputting request includes the current biometric ID; and the virtual machine further comprises an eleventh receiving sub-module, an eleventh sending sub-module, a twelfth receiving sub-module and a twelfth sending sub-module;

the eleventh receiving sub-module is configured to receive the obtaining current biometric ID request from the current wallet applet before the eighth receiving sub-module receives the registration request from the current wallet applet;

the eleventh sending sub-module is configured to send the obtaining current biometric ID request to the biometrics verification module;

the twelfth receiving sub-module is configured to receive the current biometric ID from the biometrics verification module;

the twelfth sending sub-module is configured to return the current biometric ID to the current wallet applet;

the biometrics verification sub-module further comprises a thirteenth receiving sub-module, a second obtaining sub-module and a thirteenth sending sub-module;

the thirteenth receiving sub-module is configured to receive the obtaining current biometric ID request from the virtual machine;

the second obtaining sub-module is configured to obtain the current biometric ID from the biometrics database; and the thirteenth sending sub-module is configured to return the current biometric ID obtained by the second obtaining sub-module to the virtual machine.

17. The hardware wallet as claimed in claim 15, wherein the inputting request comprises the current biometric ID;

the virtual machine further comprises: a third obtaining sub-module;

the third obtaining sub-module is configured to obtain the current biometric ID from the biometrics register result list corresponding to the current wallet applet after the eighth receiving sub-module receives the registration request from the current wallet applet.

18. The hardware wallet as claimed in claim 15, wherein in the case that the second setting sub-module sets the inputting result as the inputting is successful, the inputting result further comprises: the current biometric ID;

the first corresponding sub-module is specifically configured to build the corresponding relation between the biological feature detected by the first detecting sub-module and the current biometric ID in the biometrics database.

19. The hardware wallet as claimed in claim 15, wherein the registration request comprises the current biometric ID; the inputting request comprises the current biometric ID; and the virtual machine further comprises: a second detecting sub-module, a fourteenth sending sub-module, a fourteenth receiving sub-module and a sixth determining sub-module;

the second detecting sub-module is configured to detect whether the biometrics input result identification, which corresponds to the current biometric ID, in the biometrics register result list corresponding to the current wallet applet is the first preset identification after the eighth receiving sub-module receives the registration request from the current wallet applet, and before the eighth sending sub-module sends the inputting request to the biometrics verification module;

the fourteenth sending sub-module is configured to send the first looking up request including the biometric ID to the biometrics verification module after the second detecting sub-module detects that the biometrics input result identification is not the first preset identification;

the fourteenth receiving sub-module is configured to receive the first looking up result from the biometrics verification module;

the sixth determining sub-module is configured to determine whether the biometrics input result, which corresponds to the current biometric ID, in the biometrics database of the biometrics verification module is the first preset identification according to the first looking up result received by the fourteenth receiving sub-module;

the eighth sending sub-module is configured to send the inputting request to the biometrics verification module after the second detecting sub-module detects that the biometrics input result identification is the first preset identification; and send the inputting request to the biometrics verification module when the sixth determining sub-module determines that the biometrics input result corresponding to the current biometric ID is not the first preset identification;

the ninth sending sub-module is configured to report an error when the sixth determining sub-module determines that the biometrics input result identification corresponding to the current biometric ID is the first preset identification;

the biometrics verification module further comprises a fifteenth receiving sub-module, a seventh determining sub-module, a third setting sub-module and the fifteenth sending sub-module;

the fifteenth receiving sub-module is configured to receive the first looking up request from the virtual machine;

the seventh determining sub-module is configured to determine whether the biometrics input result identification, which corresponds to the current biometric ID, in the biometrics database is the first preset identification after the fifteenth receiving sub-module receives the first looking up request from the virtual machine;

the third setting sub-module is configured to set the first looking up result as failure when the seventh determining sub-module determines that the biometrics input result identification is the first preset identification; and to set the first looking up result as successful when the seventh determining sub-module determines the biometrics input result identification is not the first preset identification; and the fifteenth sending sub-module is configured to send the first looking up result set by the first setting sub-module to the virtual machine.

20. The hardware wallet as claimed in claim 11, wherein the current wallet applet further comprises a second generating sub-module; and the second generating sub-module is configured to generate the private key and the public key, which correspond to the key derive path, according to the master key via the key derive algorithm, and to generate the account address according to the public key before the first generating sub-module generates the transaction voucher.

* * * * *